United States Patent
Kim et al.

(10) Patent No.: US 10,362,914 B2
(45) Date of Patent: Jul. 30, 2019

(54) CLEANER AND CONTROL METHOD THEREOF

(71) Applicant: SAMSUNG ELECTRONICS CO., LTD., Suwon-si, Gyeonggi-do (KR)

(72) Inventors: Nam Su Kim, Seoul (KR); Wook Jin Lee, Seoul (KR); Bu Mun Jung, Suwon-si (KR); Young Kwan Kim, Anyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 766 days.

(21) Appl. No.: 14/594,289

(22) Filed: Jan. 12, 2015

(65) Prior Publication Data

US 2015/0265121 A1 Sep. 24, 2015

(30) Foreign Application Priority Data

Mar. 18, 2014 (KR) .................. 10-2014-0031485

(51) Int. Cl.
| | |
|---|---|
| A47L 9/28 | (2006.01) |
| H02P 27/08 | (2006.01) |
| H02K 1/27 | (2006.01) |
| H02K 7/04 | (2006.01) |
| H02K 7/14 | (2006.01) |
| H02P 6/16 | (2016.01) |
| H02P 6/20 | (2016.01) |

(Continued)

(52) U.S. Cl.
CPC ............ *A47L 9/2842* (2013.01); *A47L 9/2831* (2013.01); *H02K 1/278* (2013.01); *H02K 7/04* (2013.01); *H02K 7/14* (2013.01); *H02K 21/16* (2013.01); *H02K 29/08* (2013.01); *H02P 6/16* (2013.01); *H02P 6/20* (2013.01); *H02P 21/06* (2013.01); *H02P 27/08* (2013.01)

(58) Field of Classification Search
CPC . A47L 9/00; H02K 21/16; H02K 3/28; H02K 17/06; H02K 17/14; H02K 19/12; H02K 19/32; H02K 29/00; H02P 6/00
See application file for complete search history.

(56) References Cited

U.S. PATENT DOCUMENTS

| | | | | |
|---|---|---|---|---|
| 5,294,872 A | * | 3/1994 | Koharagi | A47L 9/2826 |
| | | | | 318/400.08 |
| 2001/0028231 A1 | * | 10/2001 | Tanaka | B41J 11/42 |
| | | | | 318/445 |

(Continued)

FOREIGN PATENT DOCUMENTS

| | | |
|---|---|---|
| DE | 39 32 802 A1 | 4/1991 |
| GB | 2 469 133 A | 10/2010 |

(Continued)

OTHER PUBLICATIONS

European Search Report dated Sep. 2, 2015 issued in corresponding European Patent Application 15154739.5.

*Primary Examiner* — Eduardo Colon Santana
*Assistant Examiner* — Said Bouziane
(74) *Attorney, Agent, or Firm* — Staas & Halsey LLP

(57) ABSTRACT

Disclosed herein are a cleaner and a control method thereof. The control method of the cleaner includes: supplying predetermined rearrangement power to a motor for a predetermined time period; detecting a position of a rotor using a hall sensor; and supplying start-up power according to the detected position of the rotor.

20 Claims, 15 Drawing Sheets

(51) Int. Cl.
*H02K 21/16* (2006.01)
*H02K 29/08* (2006.01)
*H02P 21/06* (2016.01)

(56) References Cited

U.S. PATENT DOCUMENTS

| | | | | |
|---|---|---|---|---|
| 2003/0011333 A1* | 1/2003 | Kawabata | .......... | G11B 7/08529 |
| | | | | 318/400.21 |
| 2010/0181951 A1* | 7/2010 | Noie | .......... | H02P 6/20 |
| | | | | 318/400.11 |
| 2010/0251509 A1* | 10/2010 | Clothier | .......... | A47L 5/24 |
| | | | | 15/412 |
| 2011/0124273 A1* | 5/2011 | Roh | .......... | B24B 7/228 |
| | | | | 451/259 |
| 2013/0093374 A1* | 4/2013 | Chen | .......... | H02P 1/02 |
| | | | | 318/400.29 |
| 2014/0062374 A1 | 3/2014 | Ko | | |
| 2015/0349685 A1* | 12/2015 | Schock | .......... | H02P 6/20 |
| | | | | 318/400.11 |

FOREIGN PATENT DOCUMENTS

| | | |
|---|---|---|
| JP | 2004-57450 | 2/2004 |
| JP | 2008-220812 | 9/2008 |
| JP | 2010-75612 | 4/2010 |
| KR | 1999-0048459 | 7/1999 |
| KR | 2001-0081280 A | 8/2001 |

\* cited by examiner

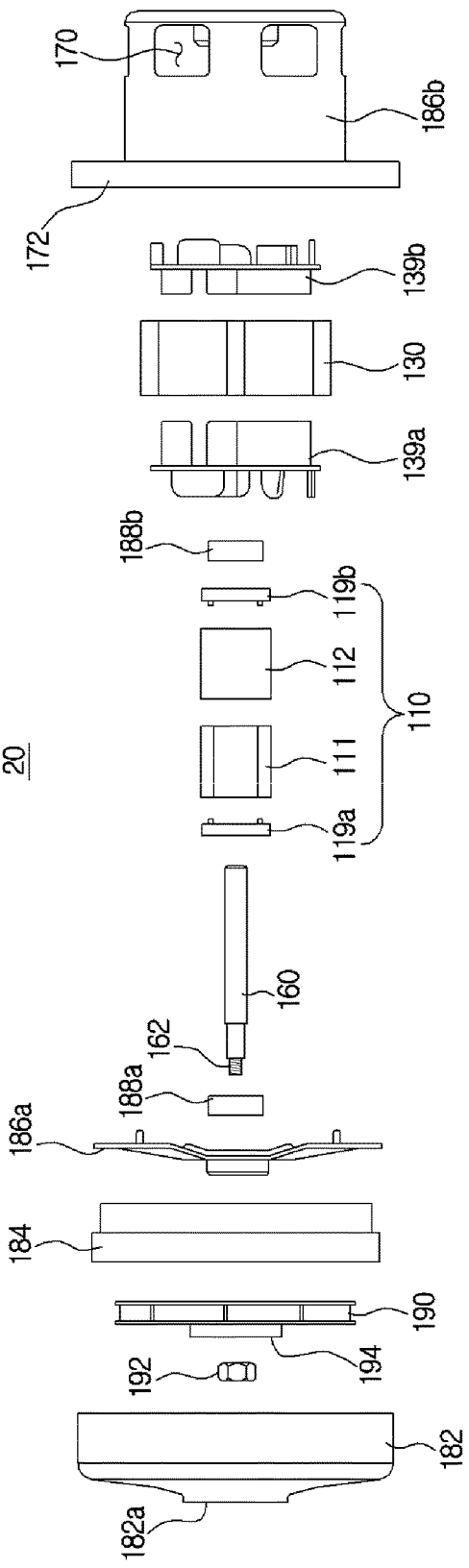

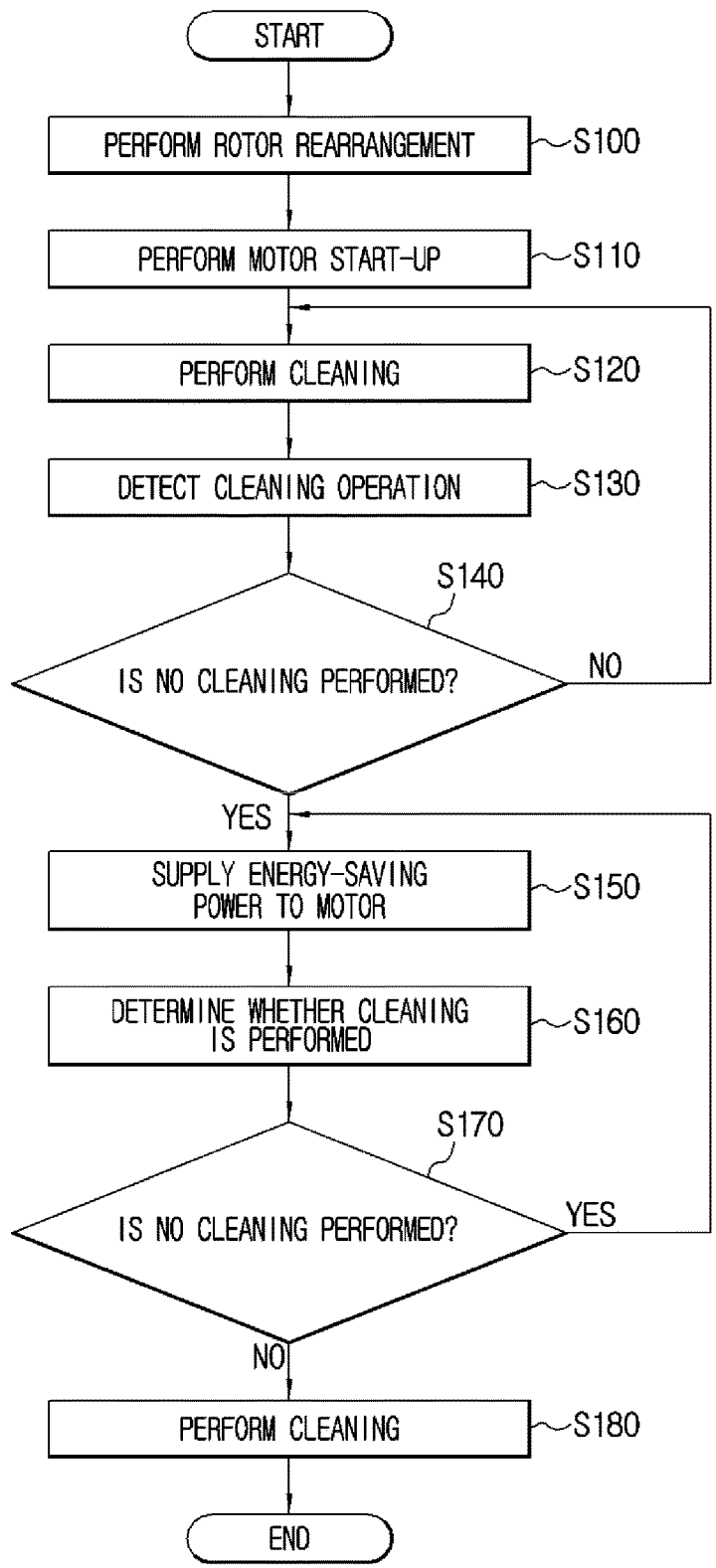

CLEANER AND CONTROL METHOD THEREOF

CROSS-REFERENCE TO RELATED APPLICATIONS

This application claims the benefit of Korean Patent Application No. 10-2014-0031485, filed on Mar. 18, 2014 in the Korean Intellectual Property Office, the disclosure of which is incorporated herein by reference.

BACKGROUND

1. Field

Embodiments of the present disclosure relate to a vacuum cleaner for controlling start-up and energy-saving of a motor, and a control method of the cleaner.

2. Description of the Related Art

A vacuum cleaner is used to clean floors or other surfaces by removing foreign materials and dusts. A universal motor is widely used as a motor included in a cleaner to generate a suction force. The universal motor essentially includes a commutator and a brush, which deteriorate the efficiency of the motor and limit the lifetime of the motor. Accordingly, a BrushLess Direct Current (BLDC) motor using permanent magnets as a rotor is widely used in a cleaner, and studies into the BLDC motor are being actively conducted.

In general, a BLDC motor uses an inverter circuit consisting of switching devices, instead of mechanical elements, such as a brush and a commutator. Accordingly, the BLDC motor does not need to brush replacement due to abrasion, and causes little electromagnetic interference while making less noise.

However, the BLDC motor using permanent magnets as a rotor generates cogging torque due to its physical structure. If the rotor is at an improper position due to such cogging torque, a start-up failure of the motor may occur. Accordingly, studies into such cogging torque are actively conducted.

Lately, along with global tendencies of increased energy regulation, a new energy efficiency rating standard has been established in the field of vacuum cleaners, so that there is a need to reduce consumption energy and to improve system efficiency. Accordingly, studies into a method of sensing the operation states of a cleaner to reduce the consumption of energy and to improve system efficiency are being actively conducted.

SUMMARY

Therefore, it is an aspect of the present disclosure to provide a cleaner for starting up a motor after rearranging a rotor without detecting a position of the rotor, or for saving energy when no cleaning is performed by determining whether cleaning is performed, and a control method of the cleaner.

Additional aspects of the disclosure will be set forth in part in the description which follows and, in part, will be obvious from the description, or may be learned by practice of the disclosure.

In accordance with an aspect of the present disclosure, a control method of a cleaner includes: supplying predetermined rearrangement power to a motor for a predetermined time period; detecting a position of a rotor using a hall sensor; and supplying start-up power according to the detected position of the rotor.

The rearrangement power may be direct current, a magnitude of the rearrangement power may be smaller than a magnitude of the start-up power, and the rearrangement power may b supplied until cogging torque of the motor reaches a maximum.

In order to cancel a rotation force generated by supplying the rearrangement power, stopping power may be supplied to the motor before the start-up power is supplied to the motor.

The control method may further include: determining whether or not cleaning is performed; and supplying energy-saving power if it is determined that no cleaning is performed. Also, the energy-saving power may be supplied such that consumption power is less than 40% of maximum power.

Whether or not cleaning is performed may be determined by measuring a rotation velocity of the rotor, by measuring a distance between a main suction port and the ground, by detecting a contact of the main suction port to the ground, or by measuring current flowing through the motor.

In accordance with another aspect of the present disclosure, a cleaner includes: a power supply; a suction port including a main suction port; a driving unit including a motor including a rotor and a stator; a sensing unit including a hall sensor to detect a position of the rotor; and a controller configured to control the power supply to supply predetermined rearrangement power to the motor for a predetermined time period, and to supply start-up power to the motor according to the detected position of the rotor.

In accordance with another aspect of the present disclosure, a cleaner includes: a power supply; a suction unit including a main suction port, a sensing unit to determine whether cleaning is currently being performed by the cleaner by determining whether the suction unit is in contact with a surface being cleaned, and a controller configured to adjust a power from the power supply based on a sensing result of the sensing unit.

In accordance with another aspect of the present disclosure, a method of powering an electric cleaning apparatus includes determining whether cleaning is currently being performed by the apparatus, and adjusting a power supplied to the cleaning apparatus based on the determining of whether cleaning is currently being performed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is an exploded view of a motor according to an embodiment of the present disclosure;

FIG. 12 is a flowchart illustrating a method of determining whether cleaning is performed and saving energy according to the result of the determination, according to an embodiment of the present disclosure.

DETAILED DESCRIPTION

Figure 1:
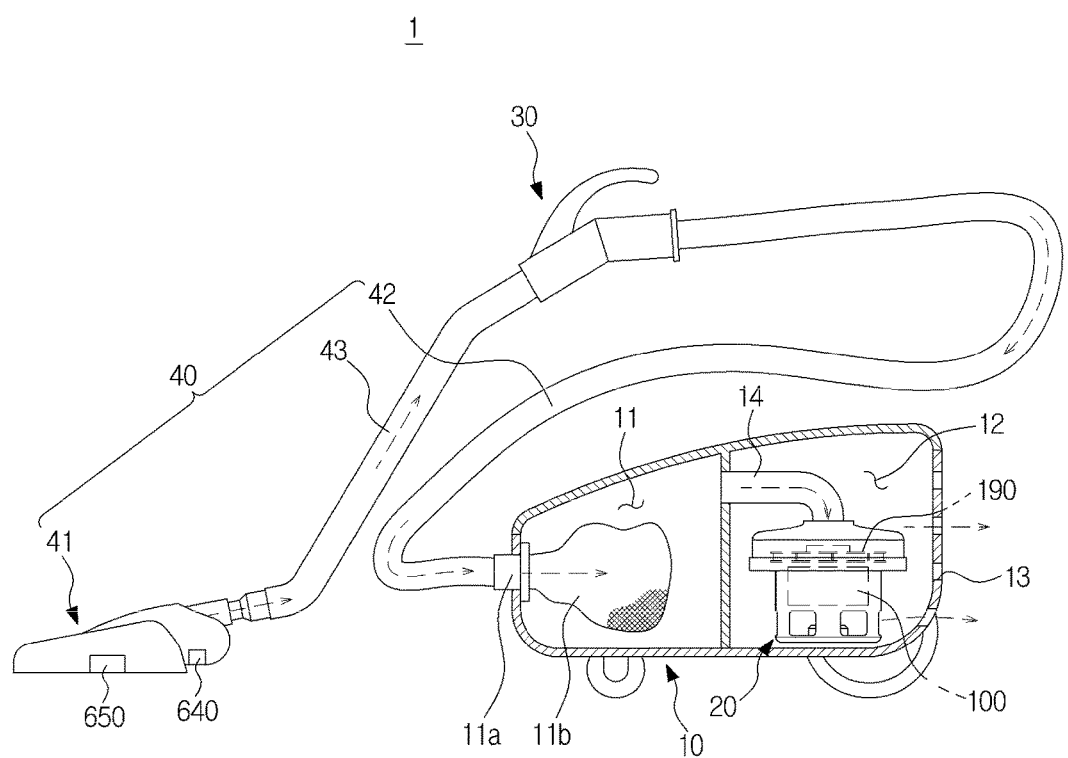
FIG. 1 illustrates an external appearance of a cleaner according to an embodiment of the present disclosure.

Now, exemplary embodiments of the present disclosure will be described in detail with reference to the appended drawings in order for one of ordinary skill in the art to easily understand and realize the present disclosure. In the following description, a detailed description of known functions and configurations incorporated herein will be omitted to avoid obscuring the subject matter of the present disclosure with unnecessary detail.

Terms used in the present disclosure are currently widely used general terms selected in consideration of the functions in the exemplary embodiments; however, they may be changed according to the intention of a user or operator, the practice, or the like. Thus, it will be appreciated that terms used in the following exemplary embodiments must be construed based on definitions disclosed in the present disclosure and if not defined, the terms must be construed as meanings that are generally understood to one of ordinary skill in the art.

Also, in the following description, aspects described optionally or configurations of embodiments described optionally must be construed as being able to be freely combined with each other, if not specified, even though they are shown as a single integrated configuration in the drawings, unless the combination is clearly a technical contradiction as determined by one of ordinary skill in the art.

Hereinafter, a cleaner and a control method thereof according to embodiments of the present disclosure will be described with reference to the appended drawings.

The following description will be given based on a 3-phase Brushless DC (BLDC) motor, however, a motor is not limited to the 3-phase BLDC motor.

Hereinafter, a cleaner according to an embodiment of the present disclosure will be described with reference to FIGS. 1 and 2.

FIG. 1 illustrates an external appearance of a cleaner according to an embodiment of the present disclosure.

Referring to FIG. 1, a cleaner 1 may include, for example, a suction unit 40 that contacts a surface to be cleaned, a handle 30, and a main body 10.

The suction unit 40 may include a brush head 41, a connecting pipe 43, and a connecting hose 42.

The brush head 41 is a portion that contacts a surface to be cleaned and that sucks in air including dust. On the bottom of the brush head 41 may be provided a brush to gather dust from a surface to be cleaned, a suction port to suck in air including dust from the surface to be cleaned and to transfer the dust to a dust chamber 11, a distance sensor 640 to measure a distance between the brush head 41 and the ground, and a contact sensor 650 to detect a contact of the brush head 41 to the ground.

The brush head 41 may be formed in the shape of a rectangle having a predetermined length. However, the brush head 41 may be formed in various shapes that can contact a surface to be cleaned to efficiently suck in dust.

The connecting pipe 43 may be connected between the brush head 41 and the handle 30. The connecting pipe 43 may transfer air including dust, sucked through the suction port of the brush head 41, to the connecting hose 42.

The connecting hose 42 may allow a user to change an area to be cleaned by moving the brush head 41 and the connecting pipe 43 in a predetermined range without having to moving the main body 10.

The connecting hose 42 may be made of plastic or rubber having elasticity. However, a material of the connecting hose 42 is not limited to these, and the connecting hose 42 may be made of any other material.

The handle 30 may be formed in a shape that allows a user to easily control the connecting pipe 43 and the brush head 41. Also, the handle 30 may include an input unit 500 on which a plurality of manipulation buttons for selecting operations of the cleaner 1 are arranged.

The main body 10 may include a dust chamber 11 to collect dust therein, and a driving chamber 12 to generate a suction force.

The dust chamber 11 may include an intake hole 11a and a dust bag 11b. The intake hole 11a may guide air such that air including dust can be sucked into the main body 10. Also, the dust bag 11b may provide a space to store dust from air come through the connecting hose 42.

The connecting hose 42 may be connected to the dust bag 11b in the main body 10 through the intake hole 11a.

The driving chamber 12 may include a motor device 20 including, for example, a motor 100, a fan 190, etc., and one or more exhaust holes 13.

The motor 100 may generate a rotation force and provide it to the fan 190, and the fan 190 may receive the rotation force from the motor 100 and generate a suction force. Also, the exhaust holes 13 may be formed in one side of the driving chamber 12, and exhaust air from which dust has been removed to the outside.

In view of flow of air with respect to the entire configuration of the cleaner 1, air may be sucked in the brush head 41 by the fan 190 that generates a suction force, and then the air may be introduced into the main body 10 via the connection hose 42. Then, the air may pass through the intake hole 11a connected to the connecting hose 42, and may be introduced into a pipe 14 connected to the driving chamber 12 to be exhausted to the outside through the exhaust holes 13.

The cleaner 1 described above with reference to FIG. 1 is a canister type, however, the cleaner 1 may equally be an upright type or a robot cleaner.

Figure 2:
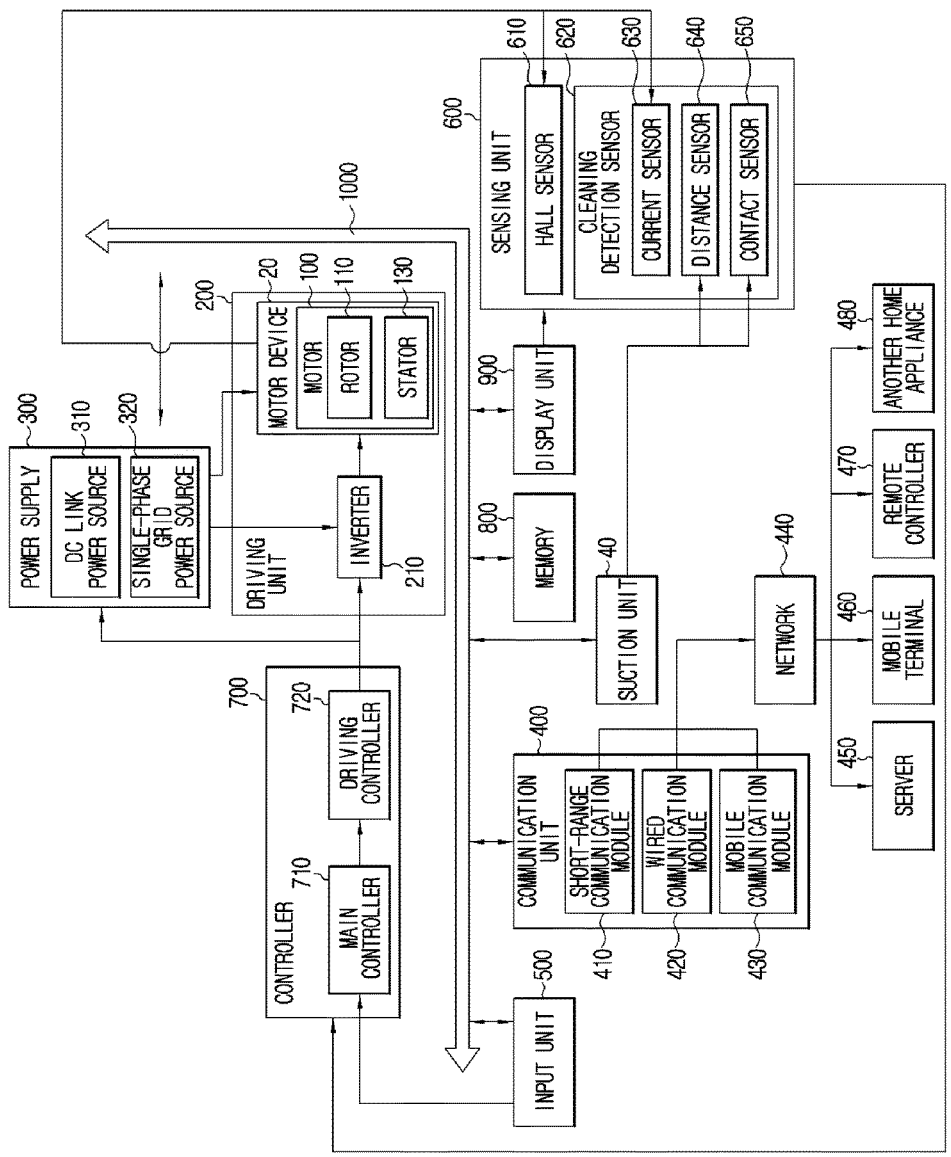
FIG. 2 is a block diagram illustrating a configuration of a cleaner according to an embodiment of the present disclosure.

FIG. 2 is a block diagram illustrating a configuration of a cleaner according to an embodiment of the present disclosure.

Referring to FIG. 2, a cleaner 1 may include, for example, a suction unit 40, a driving unit 200, a power supply 300, a sensing unit 600, a controller 700, a communication unit 400, an input unit 500, a memory 800, and a display unit 900. The above-mentioned components may be connected to each other through a bus 1000.

The suction unit 40 may suck in air including dust through a brush, and transfer the air to the dust chamber 11 included in the main body 10 (see FIG. 1).

The suction unit 40 may include a suction port. An orifice diameter of the suction port may depend on whether or not cleaning is performed. For example, if cleaning is performed, an orifice diameter of the suction port may be 13 mm, whereas if no cleaning is performed, that is, if the brush is spaced away from a surface (hereinafter, referred to as "ground" or "floor") to be cleaned, an orifice diameter of the suction port may be 50 mm. Thus, an orifice diameter of the suction port is actively changed depending on whether or not cleaning is being performed.

The configuration, function, material, and shape of the suction unit 40 may be the same as those of the suction unit 40 described above with reference to FIG. 1.

The driving unit 200 may receive a control signal from the controller 700, and generate a suction force of the cleaner 1. The driver 200 may include an inverter 210 and a motor device 20.

The inverter 210 may supply converted power to the motor 100 based on a control signal from the controller 700. The motor device 20 may convert power provided from the inverter 210 and the power supply 300 into mechanical energy, and provide a suction force to the cleaner 1. The motor device 20 may include a motor 100 including a rotor 110 and a stator 130.

The inverter 210 will be described in detail with reference to FIGS. 8 to 10, and the motor device 20 will be described in detail with reference to FIGS. 3 to 5.

The power supply 300 may include a single-phase grid power source 320 and a DC link power source 310.

The single-phase grid power source 320 may provide alternating current power to the DC link power source 310. The single-phase grid power source 320 may receive power from an external device and transfer the power to the DC link power source 310, or may convert, like a battery, chemical energy into electricity energy, and transfer the electricity energy to the DC link power source 310.

The DC link power source 310 may convert the alternating current power received from the single-phase grid power source 320 into direct current power, and provide electricity energy required for driving the inverter 210.

The sensing unit 600 may include a hall sensor 610 to measure rotational displacement of the rotor 110, and a cleaning detection sensor 620 to determine whether or not cleaning is performed.

The hall sensor 610 may be installed in a part of the upper surface of the stator 130, and measure rotational displacement of the rotor 110.

In detail, the hall sensor 610 may be made of an N-type semiconductor, and express a magnetic field as a voltage through a hall effect. Accordingly, the hall sensor 610 may detect a change of a magnetic field by rotation of the rotor 110 to output an angle, a frequency, and a driving time related to rotational displacement of the rotor 110.

As an alternate way of measuring rotational displacement of the rotor 110, an angle sensor, such as a resolver, a potentiometer, an absolute encoder, and an incremental encoder, other than the hall sensor 610 may be used.

More specifically, the resolver, which is a kind of rotary transformer, is an analog-type angle sensor that is connected to the shaft of the motor 100 and configured to output an alternating current voltage in proportion to a position of the rotor 110. The potentiometer is an angle sensor that changes variable resistance according to an angle to calculate an electrical input in direct proportion to a changing angle. The absolute encoder is an angle sensor that detects a position based on a degree of rotation using optical pulse waves without setting a reference position. The incremental encoder calculates an angle based on an increase or decrease of an angle measured after setting a reference position. The incremental encoder is an angle sensor that detects a position based on a degree of rotation using optical pulse waves.

However, the hall sensor 610 may be one of various kinds of sensors capable of measuring an angle and a frequency, other than the above-mentioned sensors.

Also, the hall sensor 610 may calculate a rotation velocity of the motor 100 based on a rotation angle, a frequency, and a driving time of the rotor 110, sensed by the hall sensor 610, and may provide information about the rotation velocity to the driving controller 720.

The cleaning detection sensor 620 may determine whether or not a user is currently cleaning, and may sense or estimate a load of the motor device 20 based on a determination result. That is, in an embodiment, the cleaning detection sensor 620 may determine whether a user is currently using the cleaner 1 to clean by maintaining the suction unit 40 in contact with the floor or other surface being cleaned, and may sense or estimate a load of the motor device 20 based on the determination result.

More specifically, when a user lifts the suction unit 40 during cleaning, such as by lifting the suction unit 40 off of the floor or other surface being cleaned, the orifice diameter of the suction port may increase so that a load of the cleaner 1 increases. In contrast, when a user cleans without lifting the suction unit 40, during cleaning, a load of the cleaner 1 is lower than when the user lifts the suction unit 40, since the orifice diameter of the suction port does not increase when the suction unit 40 is maintained in contact with the floor. Accordingly, the cleaning detection sensor 620 may measure a load of the cleaner 1 to determine whether or not cleaning is currently performed based on the measured load of the cleaner 1.

For example, if the user lifts the suction unit 40 of the cleaner 1, the orifice diameter of the suction port increases so that a load of the cleaner 1 increases. Accordingly, the cleaning detection sensor 620 may measure a distance between the brush and the ground, or detect a contact of the brush to the ground to determine whether the user is cleaning.

Also, if the user lifts the suction unit 40 of the cleaner 1, the orifice diameter of the suction port increases so that a load of the cleaner 1 increases. Accordingly, in order for the motor 100 included in the cleaner 1 to be capable of controlling velocity to generate the same output, a magnitude of current that is applied to the motor 100 must increase. Accordingly, the cleaning detection sensor 620 may measure current flowing through the motor 100, and determine that the user does not perform cleaning if the measured current value is equal to or greater than a predetermined value.

Also, since the orifice diameter of the suction port increases and a load of the cleaner 1 increases when the user lifts the suction unit 40 of the cleaner 1 from the floor, a rotation velocity of the motor 100 decreases while a constant voltage is applied to the motor 100. Accordingly, the hall sensor 610 may measure a rotation velocity of the rotor 110, and may determine that the user does not perform cleaning if the rotation velocity of the rotor 110 decreases while a control signal from the controller 700 does not change. Specifically, if the rotation velocity of the rotor 110 drops below a predetermined velocity, the hall sensor 610 may determine that the user does not perform cleaning.

The cleaning detection sensor 620 may include any one or more of a distance sensor 640 to measure a distance between the brush and the ground, a contact sensor 650 to detect a contact of the brush with the ground, and a current sensor 630 to measure a driving current.

The distance sensor 640 may be disposed on the bottom of the brush head 41 to measure a distance between the brush and the ground. More specifically, the distance sensor 640 may irradiate light to the ground to measure a time taken for the light to be reflected from the ground and then return to the distance sensor 640 or to measure intensity of the reflected light, and calculate a distance between the brush and the ground based on the measured time or the measured intensity. Accordingly, the distance sensor 640 may be an ultrasound sensor or an infrared sensor. Other than the ultrasound sensor or the infrared sensor, various sensors capable of measuring a distance between the brush and the ground may be used as the distance sensor 640.

The contact sensor 650 may be disposed on the bottom of the brush head 41 to detect a contact of the brush with the ground. Specifically, the contact sensor 650 may radiate, like the distance sensor 640, light towards the ground to detect a contact of the brush to the ground, or may measure capacitance to detect a contact of the brush with the ground. Various sensors capable of detecting a contact between the brush and the ground may be used as the contact sensor 640.

The current sensor 630 may detect driving current flowing through three input terminals of the driving motor 100. The current sensor 630 may detect a voltage drop of a shunt resistor connected in series to an input terminal of the motor 100, or detect an output of a voltage distributor connected in parallel to the motor 100 between an input terminal of the motor 100 and the ground GND, thereby detecting driving current.

The controller 700 may include a main controller 710 to control overall operations of the cleaner 1, and a driving controller 720 to control operations of the motor device 20.

The controller 700 will be described in more detail with reference to FIGS. 8, 9, and 10, later.

The communication unit 400 may be connected to the network 440 in a wired or wireless fashion to communicate with another home appliance 480 or a server 450. The communication unit 400 may receive or transmit data from and to the server 450 or the other home appliance 480 connected through a home server. Also, the communication unit 400 may perform data communication according to a standard of a home server.

The communication unit 400 may receive and transmit data related to remote control through the network 440, and receive and transmit information about operations of the other home appliance 480 through the network 440. Furthermore, the communication unit 400 may receive information about a user' life pattern from the server 450, and use the information for operations of the cleaner 1. In addition, the communication unit 400 may perform data communication with the user's mobile terminal 460, as well as the server 450 or a remote controller 470 in home.

The communication unit 400 may connect to the network 440 in a wired or wireless fashion to receive and transmit data from and to the server 450, the remote controller 470, the mobile terminal 460, or the other home appliance 480. The communication unit 400 may include one or more components to communicate with the other home appliance 480. For example, the communication unit 400 may include a short-range communication module 410, a wired communication module 420, and a mobile communication module 430.

The short-range communication module 410 may be a module for short-range communication within a predetermined range. Short-range communication technology may include Wireless LAN, Wi-Fi, Bluetooth, Zigbee, Wi-Fi Direct (WFD), Ultra WireBand (UWB), Infrared Data Association (IrDA), Bluetooth Low Energy (BLE), and Near Field Communication (NFC). However, the short-range communication technology is not limited to the above-mentioned technologies.

The wired communication module 420 may be a module for communication using electrical signals or optical signals. Wired communication technology may include any one or more of a pair cable, a coaxial cable, an optical fiber cable, a twisted-pair cable, and an Ethernet cable. However, the wired communication technology is not limited to the above-mention technologies.

The mobile communication module 430 may receive and transmit radio signals from and to at least one of a base station, an external terminal, and a server in a mobile communication network. The radio signals may include voice call signals, video call signals, or various kinds of data according to transmission/reception of text/multimedia messages.

The input unit 500 may be a combination of a plurality of manipulation buttons that are arranged on the handle 30 of the cleaner 1 (see FIG. 1) to select an operation of the cleaner 1. More specifically, the input unit 500 may be a combination of a plurality of push buttons, a combination of a plurality of slide switches, or a combination of a plurality of touch type buttons. However, any other kind of input unit that allows a user to select an operation of the cleaner 1 may be used as the input unit 500.

The memory 800 may store data about an operation of the cleaner 1 sensed by the sensing unit 600, control data of the controller 700, input data of the input unit 500, and communication data of the communication unit 400. The controller 700 may analyze the user's use pattern by analyzing the user's cleaning operation and use of the other home appliance 480 based on data stored in the memory 800.

The display unit 900 may display a control state of the cleaner 1 that is controlled by the controller 700 and an operation state of the cleaner 1 that is sensed by the sensing unit 600, visually, acoustically, and/or tactually, for the user.

Hereinafter, a configuration of the motor device 20 according to an embodiment of the present disclosure will be described with reference to FIG. 3.

FIG. 3 is an exploded view of the motor device 20 according to an embodiment of the present disclosure.

The motor device 20 may be installed in the driving chamber 12 of the cleaner 1 (see FIG. 1). In the uppermost part of the motor device 20 may be provided a motor cover 182, and in the lowermost part of the motor device 20 may be provided a second housing 186*b*.

More specifically, the motor device 20 may include the motor cover 182, a nut 192, a fan 190, a diffuser 184, a first housing 186*a*, one or more bearings 188*a* and 188*b*, a shaft 160, a rotor 110, a stator 130, one or more insulators 139*a* and 139*b*, and the second housing 186*b*.

The motor cover 182 may cover the fan 190 to protect the fan 190, the motor 100, and other components. The motor cover 182 may be in a shape of a circular cover to cover the fan 190. Also, in the center of the motor cover 182 may be formed a hole 182*a* so that air can flow into the inside of the motor device 20 through the hole 182*a*.

The nut 192 may couple the fan 190 with the shaft 160. In the fan 190, a bore 194 penetrating the center part of the fan 190 may be formed such that the shaft 190 can pass through the bore 194, and the nut 192 may be coupled with the end of the shaft 160 passed through the bore 194 of the fan 190 to provide a clamping force to connect the fan 190 to the shaft 160. Accordingly, the fan 190 and the shaft 160 that rotate at high speed may be closely coupled with each other by the clamping force provided by the nut 192.

The fan 190 may intake air through the hole 182a of the motor cover 182, and generate the flow of air. The fan 190 that is used in the cleaner 1 may have a structure with a narrow upper portion and a wide lower portion. However, various structures capable of intaking air and introducing the air to the inside of the main body 10 may be applied to the fan 190.

The diffuser 184 may appropriately adjust flow of air generated by the fan 190 to guide the air in order to acquire desired flow performance. Also, the diffuser 184 can also be called a fan guide.

The first housing 186a may function as a supporting part of the bearing 188a and a rest unit of the diffuser 184. The edge of the first housing 186a may be connected to the second housing 186b so as to protect the rotor 110 and the stator 130.

Also, the first housing 186a may be in a shape of a circle or a ribbon. However, the first housing 186a may have any other shape which can support the bearing 188a and on which the diffuser 184 can be rested.

The bearings 188a and 188b may fix the rotor 110 that is connected to the shaft 160, at predetermined positions. The bearings 188a and 188b may be positioned at both ends of the rotor 110. More specifically, the bearings 188a and 188b may include a first bearing 188a interposed between the rotor 110 and the first housing 186a, and a second bearing 188b interposed between the rotor 110 and the second housing 186b.

The shaft 160 may be rotatable, and transfer a rotation force of the rotor 110 to the fan 190. The shaft 160 may be in a shape of a bar that can penetrate the center of the motor device 20, and the head end of the shaft 160 may be coupled with the fan 190. The shaft 160 may be coupled with the rotor 110, and the bearings 188a and 188b may be disposed at both ends of the rotor 110 to guide the shaft 160 and the rotor 110 so that the shaft 160 and the rotor 110 can rotate smoothly.

The rotor 110 may include balances 119a and 119b for balancing, a rotor core 111 into which the shaft 160 is inserted, and permanent magnets 115a to 115d (see FIG. 4a) to provide a magnetic force.

Also, the rotor 110 may be in a shape of a cylinder, and a passage which the shaft 160 can penetrate may be formed in the rotor 110 along the principle axis. However, any other structure capable of providing a rotation force of the motor 100 to the shaft 160 can be applied to the rotor 110.

The balances 119a and 119b may be coupled with the rotor core 111 to eliminate imbalance that can occur upon rotation. More specifically, by coupling the balances 119a and 119b, which can be easily machined, with the rotor 110, which cannot be easily machined, and machining the balances 119a and 119b, the rotor 110 can be balanced. Also, the balances 119a and 119b may include a first balance 119a and a second balance 119b that are respectively coupled with both ends of the rotor 110.

Figure 4A:
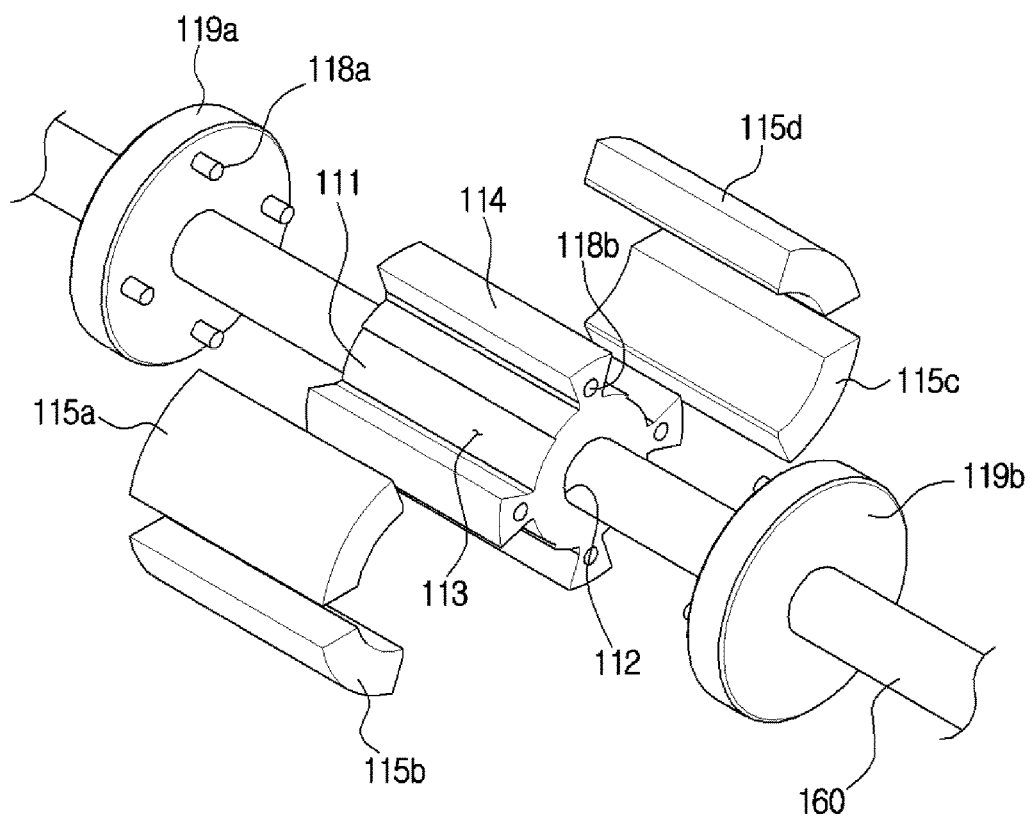
FIG. 4A is an exploded view of a rotor in a motor according to an embodiment of the present disclosure.
Figure 4B:
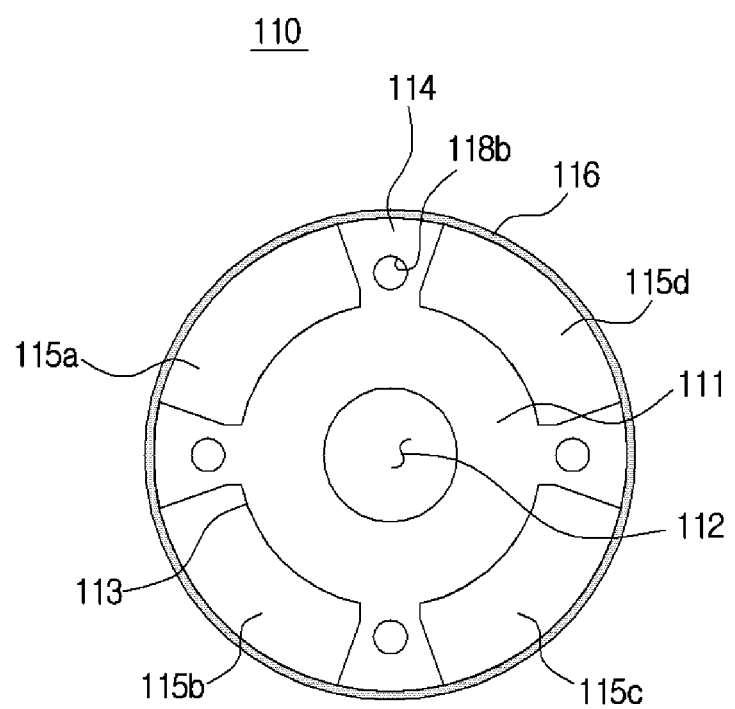
FIG. 4B is a cross-sectional view of a rotor in a motor according to an embodiment of the present disclosure.

Referring to FIGS. 4A and 4B, in the center part of the rotor core 111 may be formed a hole through which the shaft 160 can pass, and the rotor core 111 may be coupled with the shaft 1260 through the hole. Also, the permanent magnets 115a to 115d may be arranged around the rotor core 111.

The permanent magnets 115a to 115d may be arranged in pairs around the rotor core 111, each pair consisting of N and S poles. For example, as shown in FIG. 4A, first and third permanent magnets 115a and 115c that are N poles may be paired with second and fourth permanent magnets 115b and 115d that are S poles, and the first to fourth permanent magnets 115a to 115d may be arranged around the rotor core 111. The number and shapes of the permanent magnets 115a to 115d may be decided such that an attractive force and a repulsive force can efficiently interact with an electromagnetic force that is applied to the stator 130.

The permanent magnets 115a to 115d may be made of a ferrite material. Ferrite material refers to a solid solution obtained by melting alloying elements or impurities in iron of body-centered cubic crystals, however, the ferrite material may mean ceramics that have magnetic properties or that respond to a magnetic field. However, the permanent magnets 115a to 115d may be made of any other material that can apply an attractive force and a repulsive force between a magnetic field of the permanent magnets 115a to 115d and a magnetic field formed by a voltage applied to the wirings 138a to 138f (see FIG. 5) of the stator 130.

Figure 5:
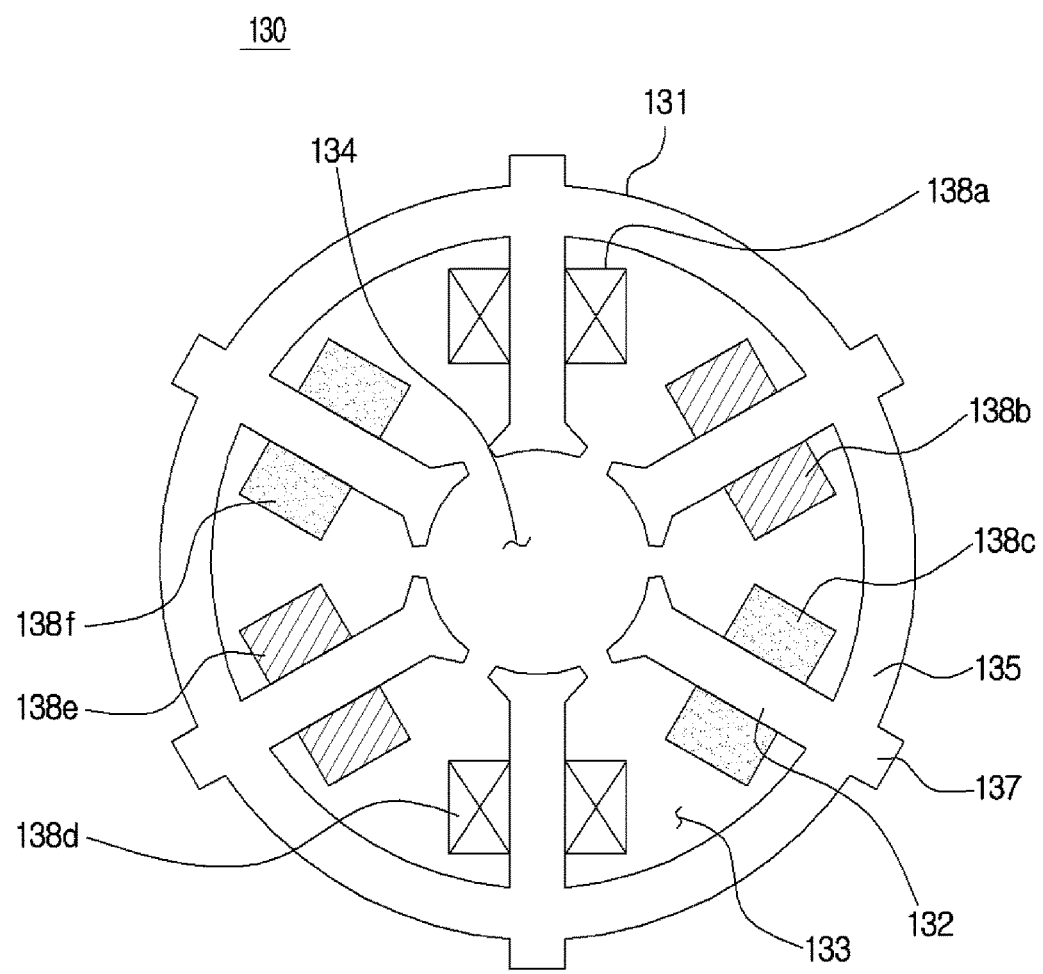
FIG. 5 is a cross-sectional view of a stator in a motor according to an embodiment of the present disclosure.

Referring to FIG. 5, the stator 130 may include a teeth unit 132 (132 for each teeth piece) forming a frame, a slot 133, and wirings 138a to 138f wired around the teeth unit 132. Also, the stator 130 may have a space to receive the rotor 110 in the center portion.

The insulators 139a and 139b may be made of an insulating material. The insulators 139a and 139b may include a first insulator 139a and a second insulator 139b that may be respectively coupled with the upper and lower parts of the stator 130.

In the second housing 186b, components, such as the rotor 110 and the stator 130, coupled with the shaft 160 may be rested.

More specifically, the second housing 186b may be in the shape of a hat whose one side is opened to form an opening 172 and whose other side is closed. Also, the opening 172 may be coupled with the first housing 186a to protect the components rested therein. Also, around the second housing 186b, a plurality of holes 170 may be formed so that air coming into the motor device 20 can be expelled through the holes 172.

Hereinafter, a rotor according to an embodiment of the present disclosure will be described with reference to FIGS. 4A and 4B.

FIG. 4A is an exploded view of a rotor in a BLDC motor according to an embodiment of the present disclosure;

Referring to FIG. 4A, a rotor 110 may include, for example, a rotor core 111, a first permanent magnet 115a, a second permanent magnet 115b, a third permanent magnet 115c, a fourth permanent magnet 115d, a first balance 119a, and a second balance 119b.

Around the rotor core 111, four permanent magnets 115a to 115d may be arranged in consideration of core loss according to high-speed driving, the switching frequency of the inverter 210 (see FIG. 2), etc. The four permanent magnets 115a to 115d may be respectively arranged in four grooves formed in the rotor core 111 such that neighboring permanent magnets have different polarities. Also, the shaft 160 may be inserted into the hollow portion 112 of the rotor core 111.

The rotor core 111 may have protrusions protruded from the center of rotation in order to obtain additional reluctance torque when the rotor 110 rotates. More specifically, the rotor core 111 may include a plurality of protrusions 114 protruded from the center of rotation in a circumferential direction. Each protrusion 114 may be protruded in the circumferential direction of the rotor core 111, and have a fan shape with an arc wherein an external angle is greater than an internal angle.

The number of the plurality of protrusions 114 may correspond to the number of the grooves 113 of the rotor core 111, and also correspond to the number of the permanent magnets 115a to 115d. For example, as shown in FIG. 4A, four protrusions 114 may be protruded on the outer circumferential surface of the rotor core 111 from the center of rotation in the circumference direction.

The first permanent magnet 115a, the second permanent magnet 115b, the third permanent magnet 115c, and the fourth permanent magnet 115d may be positioned in the four grooves 113 formed between the four protrusions 114. Also, if the first permanent magnet 115a, the second permanent magnet 115b, the third permanent magnet 115c, and the fourth permanent magnet 115d are coupled with the rotor core 111, the section of the rotor 110 may have a ring shape.

The magnetization direction of the permanent magnets 115a to 115d may be a parallel direction or a radial direction. In view of sinusoidal of air-gap flux density, it will be advantageous that the magnetization direction of the permanent magnets 115a to 115d is a parallel direction.

The balances 119a and 119b may act to balance the rotating rotor 110. The balances 119a and 119b may be machined to balance the rotor 110 when including the balances 119a and 119b. Each of the balances 119a and 119b may be in a shape of a circle having the same size as the section of the rotor 110, and the balances 119a and 119b may include a first balance 119a that is coupled with the upper part of the rotor 110, and a second balance 119b that is coupled with the lower part of the rotor 110.

Protrusions 118a formed on the balances 119a and 119b may be respectively inserted into grooves 118b formed in both ends of the rotor 110 so that the rotor 110 can be coupled with the balances 119a and 119b. For example, as shown in FIG. 4A, four grooves 118b may be formed in each end of the rotor core 111. In correspondence to the grooves 118b, four protrusions 118a may be formed on each of the balances 119a and 119b. The protrusions 118a formed on the balances 119a and 119b may be inserted into the grooves 118b of the rotor 110 so that the balances 119 can be coupled with the rotor 110.

FIG. 4B is a cross-sectional view of the rotor 110 in the BLDC motor according to an embodiment of the present disclosure.

As shown in FIG. 4B, a scattering prevention structure 116 may be provided around the circumference surface of the rotor 110 in which the rotor core 111 is coupled with the permanent magnets 115a to 115d. The scattering prevention structure 116 may function to fix the permanent magnets 115a to 115d coupled with the rotor core 111 so that the permanent magnets 115a to 115d will not be scattered. Also, the scattering prevention structure 116 may be made of structural steel such as stainless steel, heat shrinkable tube, or high-strength plastic. However, the scattering prevention structure 116 may be made of any other material capable of fixing the permanent magnets 115a to 115d arranged with the rotor core 111 so that the permanent magnets 115a to 115d will not be scattered.

As shown in FIG. 4B, the section of the rotor 110 including the rotor core 111, the permanent magnets 115a to 115d, and the balances 119a and 119b may have a shape in which a hollow portion is formed in the center.

Hereinafter, the stator 130 according to an embodiment of the present disclosure will be described with reference to FIG. 5.

FIG. 5 is a cross-sectional view of the stator 130 in the motor device 20 according to an embodiment of the present disclosure.

The stator 130 may include, for example, a stator core 131 forming a skeleton, and wirings 138 wired around the stator core 131.

The stator core 131 may function as a support frame for maintaining the shape of the stator 130, and provide a space in which the wirings 138 can be positioned.

The stator core 131 may include, for example, a plurality of teeth pieces 132, a main core 135, and fixing protrusions 137.

The teeth unit 132 may be positioned inside of the stator core 131, and may be a portion protruded from the main core 135. The teeth unit 132 may partition the inside space of the stator core 131 into a plurality of slots 133. Also, the teeth unit 132 may provide a space in which the wirings 138 are positioned, and may be magnetized to one of N and S poles by a magnetic field formed by a voltage applied to the wirings 138.

Also, each teeth piece 132 may be "Y"-shaped, and have a curved surface at a part adjacent to the rotor 110 such that an attractive force and a repulsive force efficiently act with respect to the permanent magnets 115a to 115d of the rotor 110. However, the teeth unit 132 may have any other structure capable of providing a space in which the wirings 138 are positioned and efficiently generating an attractive force and a repulsive force with respect to the permanent magnets 115a to 115d.

The main core 135 may form a skeleton of the stator core 131 to maintain the shape of the stator core 131, and the plurality of teeth pieces 132 may be connected to the main core 135. Also, the main core 135 may provide a passage forming a magnetic field such that when a teeth piece is magnetized to a polarity by a voltage, another teeth piece neighboring the teeth piece can be inductively magnetized to a polarity that is different from the polarity magnetized by the voltage.

The main core 135 may be in a shape of a cylinder. Also, the plurality of teeth pieces 132 may be arranged on the inner surface of the main core 135, and the plurality of fixing protrusions 137 may be formed on the outer surface of the main core 135. However, the main core 135 may have any other structure capable of maintaining the shape of the stator core 131 and locating the teeth pieces 132 and the fixing protrusions 137 thereon.

The fixing protrusions 137 may provide a fixing force so that the stator 130 is fixed on the second housing 186b without being separated from the second housing 186b and rotating although a rotation force is generated due to an attractive force and a repulsive force between a magnetic field formed by applying a voltage to the wirings 138a to 138f and a magnetic field formed by the permanent magnets 115a to 115d.

The fixing protrusions 137 may be formed in parallel to the shaft 160 on the outer surface of the main core 135 so as to be coupled in pairs with grooves of the second housing 186b. However, the fixing protrusions 137 may have any other structure capable of fixing the stator 130 on the second housing 186b.

The stator core 131 including the teeth pieces 132, the main core 135, and the fixing protrusions 137 may be magnetized by a voltage that is applied to the wirings 138a to 138f, and the stator core 131 may be made of a metal material that can easily form a magnetic field for induced magnetization of neighboring teeth pieces 132. However, the stator core 131 may be made of any other material that can be magnetized by a voltage that is applied to the wirings 138a to 138f, and easily form a magnetic field for induced magnetization of neighboring teeth pieces 132.

The wirings 138a to 138f may be wired around the teeth pieces 132 of the stator core 131 to form a magnetic field according to applied power. Accordingly, the wirings 138a to 138f may magnetize the teeth pieces 132 around which they are wired.

The wirings 138a to 138f may include a first wiring 138a, a second wiring 138b, a third wiring 138c, a fourth wiring 138d, a fifth wiring 138e, and a sixth wiring 138f. The first wiring 138a, the second wiring 138b, the third wiring 138c, the fourth wiring 138d, the fifth wiring 138e, and the sixth wiring 138f may be arranged clockwise in this order. In FIG. 5, the first wiring 138a is positioned at 12 o'clock, the second wiring 138b is positioned at 2 o'clock, the third wiring 138c is positioned at 4 o'clock, the fourth wiring 138d is positioned at 6 o'clock, the fifth wiring 138e is positioned at 8 o'clock, and the sixth wiring 138f is positioned at 10 o'clock The power that is applied to the wirings 138a to 138f may be 3-phase power or a single-phase power.

If the power that is applied to the wirings 138a to 138f is 3-phase power, the first wiring 138a and the fourth wiring 138d may be paired to supply U-phase power, the second wiring 138b and the fourth wiring 138d may be paired to supply V-phase power, and the third wiring 138c and the sixth wiring 138f may be paired to supply W-phase power.

If the power that is applied to the wirings 138a to 138f is single-phase power, the first wiring 138a, the third wiring 138c, and the fifth wiring 138e may be paired to supply power of the same polarity, and the second wiring 138b, the fourth wiring 138d, and the sixth wiring 138f may be paired to supply power of the same polarity. Alternatively, the first wiring 138a, the second wiring 138b, and the third wiring 138c may be paired to supply power of the same polarity, and the fourth wiring 138d, the fifth wiring 138c, and the sixth wiring 138f may be paired to supply power of the same polarity. However, various combinations of the wirings 138a to 138f which can control the rotation of the rotor 10 and by which an attractive force and a repulsive force can efficiently act with magnetic fields of the rotor 110 and the stator 130 may be used.

A method of wiring the wirings 138a to 138f around the teeth pieces 132 may include concentrated wiring and distributed wiring. Concentrated wiring is a method of wiring a single-phase, single-pole wire around a single slot in a stator, and distributed wiring is a method of wiring wires around two or more slots in an electrical device with slots. However, any other method of wiring the wirings 138a to 138f around the teeth pieces 132 may be may be used that is capable of efficiently magnetizing the teeth pieces 132.

The wirings 138a to 138f may be made of copper, aluminum, and a composite of copper and aluminum. However, the wirings 138a to 138f may be made of any other material capable of efficiently magnetizing the teeth pieces 132.

The configuration of the cleaner 1 according to an embodiment of the present disclosure has been described.

Hereinafter, operations of the cleaner 1 according to an embodiment of the present disclosure will be described.

First, a start-up failure related to cogging torque in the motor device 20 in which the rotor 110 is coupled with the stator 130 will be described with reference to FIGS. 6A, 6B, 6C, and 7, below.

Figure 6A:
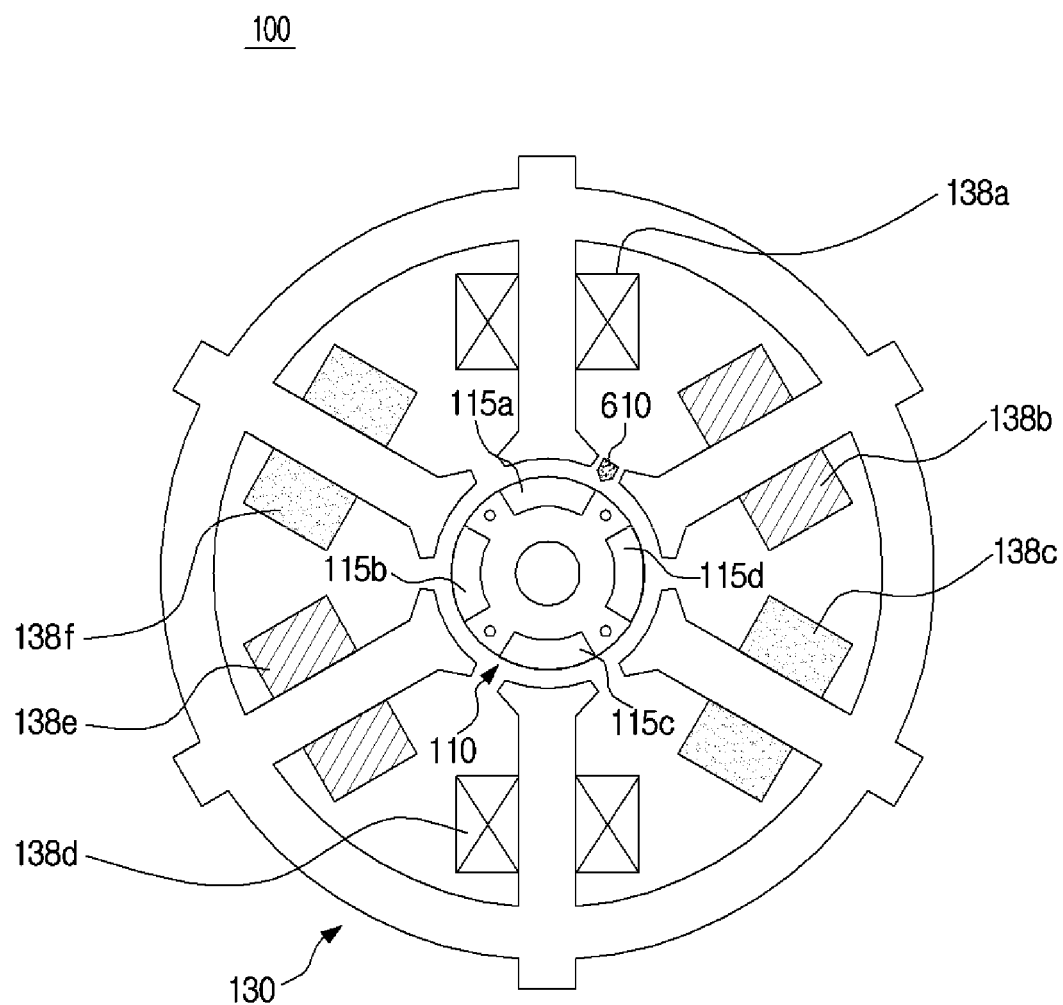
FIG. 6A is a cross-sectional view of a motor when a rotor is at a position A, according to an embodiment of the present disclosure.
Figure 6B:
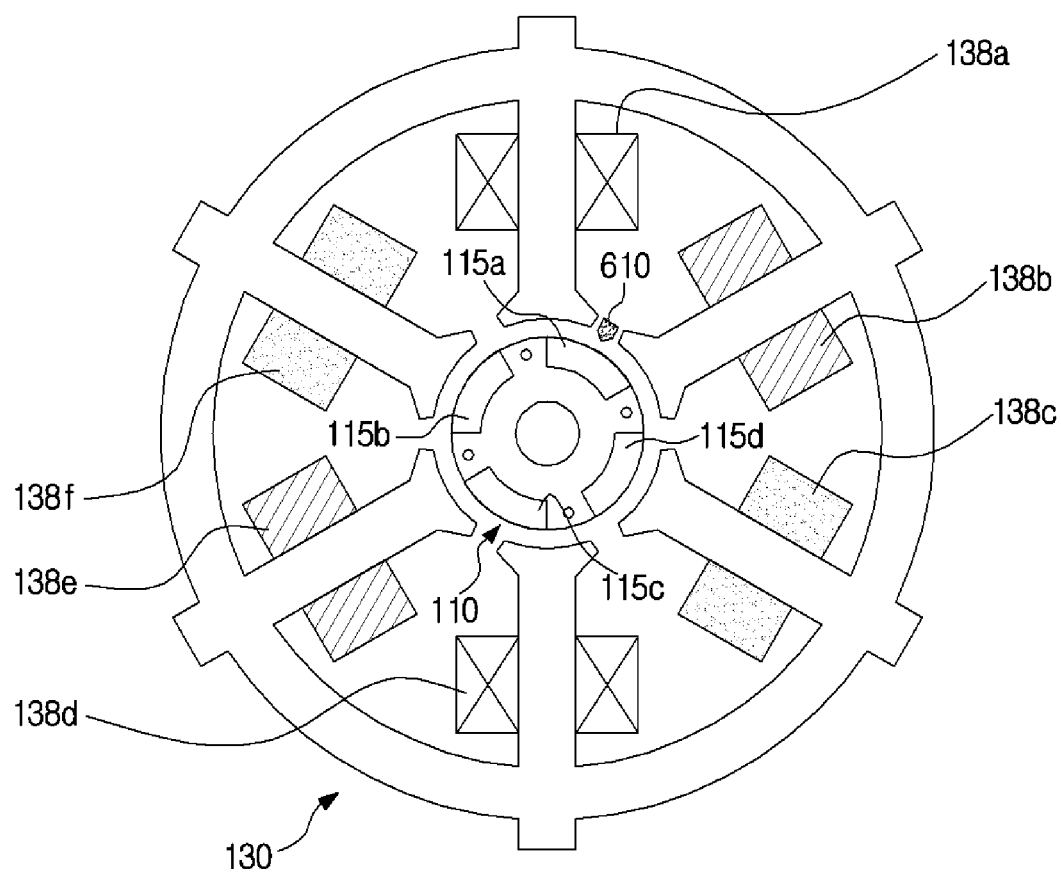
FIG. 6B is a cross-sectional view of a motor when a rotor is at a position B, according to an embodiment of the present disclosure.
Figure 6C:
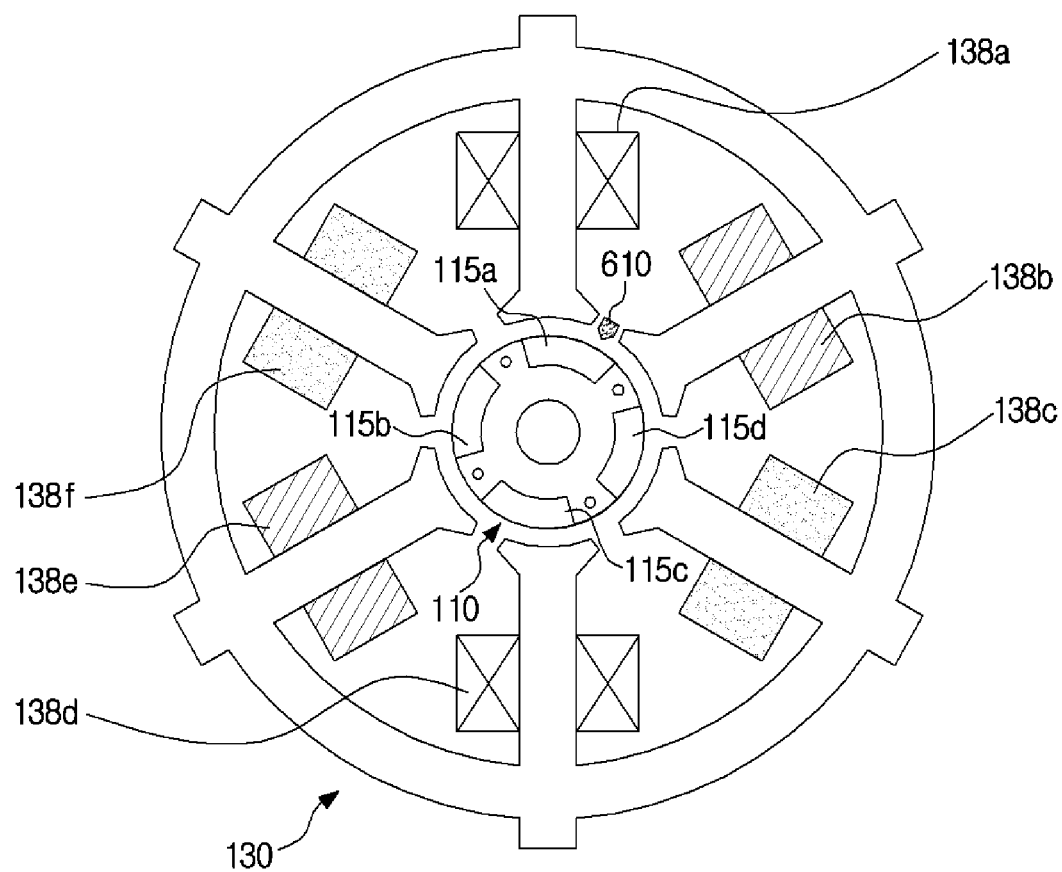
FIG. 6C is a cross-sectional view of a motor when a rotor is at a position C, according to an embodiment of the present disclosure.

FIG. 6A is a cross-sectional view of the motor device 20 when the rotor 110 is at a position A, according to an embodiment of the present disclosure, FIG. 6B is a cross-sectional view of the motor device 20 when the rotor 110 is at a position B, according to an embodiment of the present disclosure, and FIG. 6C is a cross-sectional view of the motor device 20 when the rotor 110 is at a position C, according to an embodiment of the present disclosure.

As shown in FIGS. 6A, 6B, and 6C, the rotor 110 may be positioned inside of the stator 130, and the shaft 160 may be positioned in the center of the rotor 110. The rotor core 111 may be coupled with the shaft 160, the permanent magnets 115a to 115d may be coupled with the rotor core 111 to surround the rotor core 111, and the scattering prevention structure 116 may surround the rotor core 111 and the permanent magnets 115a to 115d to support the rotor core 111 and the permanent magnets 115a to 115d. The stator core 131 may be disposed outside the scattering prevention structure 116 to surround the rotor 110, and the wirings 138a to 138f may be wired around the teeth pieces 132 of the stator core 131. The hall sensor 610 may be disposed between two neighboring teeth pieces 132 of the stator 130.

Figure 7:
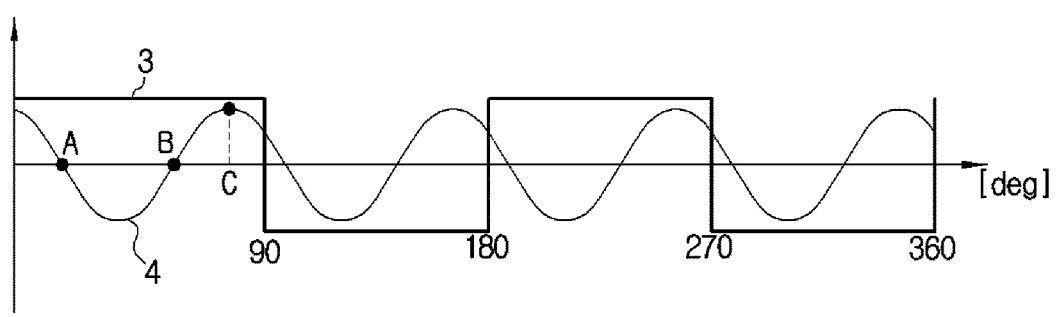
FIG. 7 is a graph showing cogging torque of a motor and a signal of a hall sensor according to the position of a rotor, according to an embodiment of the present disclosure.

FIG. 7 is a graph showing cogging torque of the motor device 20 and a signal of the hall sensor 610 according to the position of the rotor 110, according to an embodiment of the present disclosure.

Cogging torque 4 may be generated due to a change in reluctance of the rotor 110 and the stator 130 when the rotor 110 including the permanent magnets 115a to 115d of the motor 100 rotates. More specifically, the cogging torque 4 may be generated due to the physical structure of the motor 100 regardless of the internal circuit of the cleaner 1. When a magnetic field of the rotor 110 including the permanent magnets 115a to 115d is applied to the stator 130 in the BLDC motor 100, the magnetic field of the rotor 110 may be applied to the teeth pieces 132 of the stator 130 or to the slots 133 of the stator 130, according to the position of the rotor 110. In this case, cogging torque 4 may change at a specific cycle due to a difference of a distance from the permanent magnets 115a to 115d of the rotor 110 to the teeth pieces 132 of the stator 130 and a distance from the permanent magnets 115a to 115d of the rotor 110 to the main core 135 of the stator 130, whenever the rotor 110 rotates, as shown in FIG. 7.

Referring to FIG. 7, cogging torque 4 is at a location A when the first permanent magnet 115a, the third permanent magnet 115c, the teeth piece 132 around which the first wiring 138a is wired, and the teeth piece 132 around which the fourth wiring 138d is wired are aligned, as shown in FIG. 6A. If start-up power is applied to the wirings 138a to 138f when the rotor 100 is at this position, a repulsive force acts between a magnetic field formed due to application of the start-up power to the first wiring 138a and a magnetic field of the first permanent magnet 115a, and a repulsive force acts between a magnetic field formed due to application of the start-up power to the fourth wiring 138d and a magnetic field of the third permanent magnet 115c, so that the motor 100 can start up.

Referring again to FIG. 7, cogging torque 4 is at a location B when the first permanent magnet 115a, the third permanent magnet 115c, the slot 133 between the first wiring 138a and the second wiring 138b, and the slot 133 between the forth wiring 138d and the fifth wiring 138e are aligned, as shown in FIG. 6B. If start-up power is applied to the wirings 138a to 138f when the rotor 100 is at this position, a repulsive force acts between a magnetic field formed due to application of the start-up power to the first wiring 138a and a magnetic field of the first permanent magnet 115a, and an attractive force acts between the magnetic field formed due to application of the start-up power to the first wiring 138a and a magnetic field of the second permanent magnet 115b. Also, a repulsive force acts between a magnetic field formed due to application of the start-up power to the fourth wiring 138d and a magnetic field of the third permanent magnet 115c, and an attractive force acts between the magnetic field formed due to application of the start-up power to the fourth wiring 138d and a magnetic field of the fourth permanent magnet 115d. In this case, the attractive forces and the repulsive forces acting the magnetic fields formed due to application of the start-up power to the first wiring 138a and the fourth wiring 138d and the magnetic fields of the permanent magnets 115a to 115d become parallel, so that a start-up failure of the motor 100 occurs.

Referring again to FIG. 7, cogging torque 4 is at a location C when the first permanent magnet 115a is positioned across the teeth piece 132 around which the second wiring 138b is wired and the slot between the first wiring 138a and the second wiring 138b, and the third permanent magnet 115c is positioned across the teeth piece 132 around which the fifth wiring 138e is wired and the slot 133 between the fourth wiring 138d and the fifth wiring 138e, as shown in FIG. 6C. In this case, cogging torque 4 of the motor 100 reaches a maximum, and then the rotor 110 may return to a start-up position.

As described above, if the rotor 110 is at the position B as shown in FIG. 6B so that cogging torque 4 is at the location B of FIG. 7, a start-up failure of the motor 100 occurs. In this event, if rearrangement power is applied to rotate the rotor 110 before start-up power is applied to the motor 100, under an assumption that cogging torque 4 of the rotor 110 is at the location B, a start-up failure of the motor 110 due to an improper position of the rotor 110 may be avoided.

In detail, the controller 700 may control the power supply 300 (see FIG. 2) to supply the rearrangement power to the motor 100 before applying start-up power to the motor 100. That is, the controller 700 may control the power supply 300 to supply the rearrangement power to the motor 100 such that torque that is generated by the rearrangement power is greater than cogging torque 4 of the motor 100.

Also, the controller 700 may control the rearrangement power such that the rearrangement power is supplied as a predetermined direct current voltage for a predetermined time period. For example, a magnitude of the rearrangement power may be smaller than that of the start-up power, and the rearrangement power may be supplied until cogging torque 4 reaches a maximum.

Values of the predetermined time period and the predetermined direct current voltage may be input by a user through the input unit 500, or may have been stored in the memory 800, according to the specification of the motor 100, such as the number of poles of the motor 100, the magnitude of cogging torque, and the number of turns of each of the wiring 138a to 138f. However, the predetermined time period and the predetermined direct current voltage may be decided depending on other various variables than the above-mentioned factors.

Also, the controller 700 may control the power supply 300 to supply stopping power to the motor 100 before applying the rearrangement power and the start-up power to the motor 100.

In detail, a stopping voltage of 0V may be supplied to demagnetize the motor 100 to a free-wheel state without excitation.

The stopping power may be supplied in an opposite direction to that of the rearrangement power so as to generate torque in a direction that is opposite to the rotation direction of the motor 100. For example, in order to generate torque in a direction that is opposite to the rotation direction of the motor 100, the controller 700 may supply negative q-axis current corresponding to a torque component of the stopping power to the motor 100, and in order to prevent a voltage of the inverter 210 from rising due to a reversed electromotive force generated when the negative q-axis current is supplied to the motor 100, the controller 700 may supply positive d-axis current corresponding to a flux component of the stopping power to the motor 100.

Also, the stopping power may be supplied such that the voltage of 0V and the voltage in the opposite direction of that of the rearrangement power have a predetermined duty ratio.

Also, the stopping power may be supplied after the predetermined time period for which the rearrangement power is applied has elapsed, or when a signal from a hall sensor 610 is reversed, as shown in FIG. 7. A time at which the stopping power is supplied may be decided in advance according to the specification of the motor 100.

If the rearrangement power is applied so that the rotor 110 is at a proper position, the controller 700 may control the power supply 300 to supply start-up power to the motor 100 to start up the motor 100. More specifically, the hall sensor 610 may determine polarity of the permanent magnet 115 adjacent to the corresponding teeth pieces 132, and the controller 700 may determine polarity of start-up power such that a repulsive force acts with respect to a magnetic field of the permanent magnet 115, and supply the start-up power to the motor 100.

For example, if the first permanent magnet 115 and the third permanent magnet 115 are N poles and the second permanent magnet 115b and the fourth permanent magnet 115d are S poles, the controller 700 may control the power supply 300 to supply start-up power for magnetizing the teeth pieces 132 around which the first wiring 138a and the fourth wiring 138d are wired to the first wiring 138a and the fourth wiring 138d.

As described above, instead of sensing a current position of the rotor 110 using the hall sensor 610 and supplying a voltage corresponding to the current position of the rotor 110, by supplying rearrangement power regardless of a current position of the rotor 110 before supplying start-up power to locate the rotor 110 at a proper position, a start-up failure of the motor 100 may be reduced.

Hereinafter, a cleaning control method of the cleaner 1 according to an embodiment of the present disclosure will be described with reference to FIGS. 8, 9, and 10.

Figure 8:
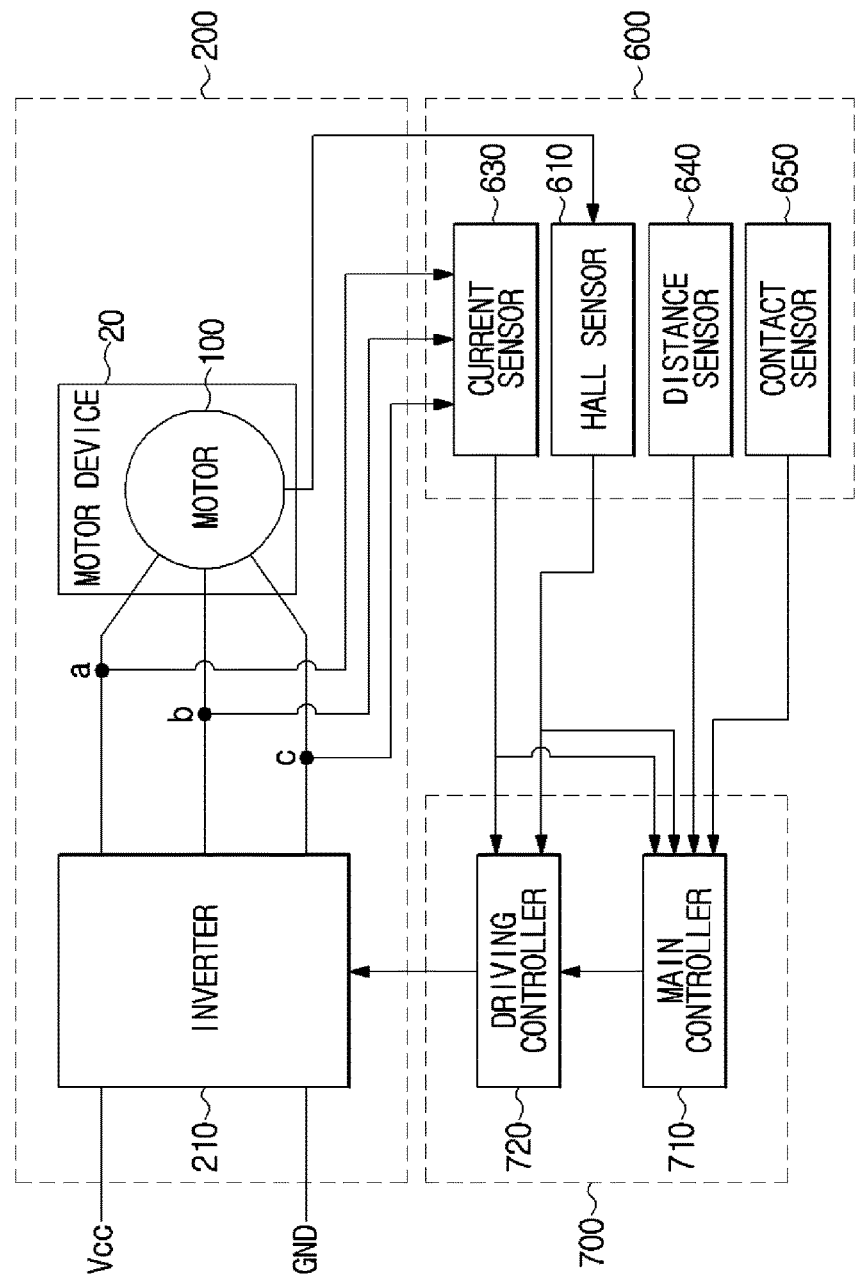
FIGS. 8, 9, and 10 are block diagrams illustrating configurations of a driving unit, a sensing unit, and a controller of a cleaner, according to an embodiment of the present disclosure.
Figure 9:
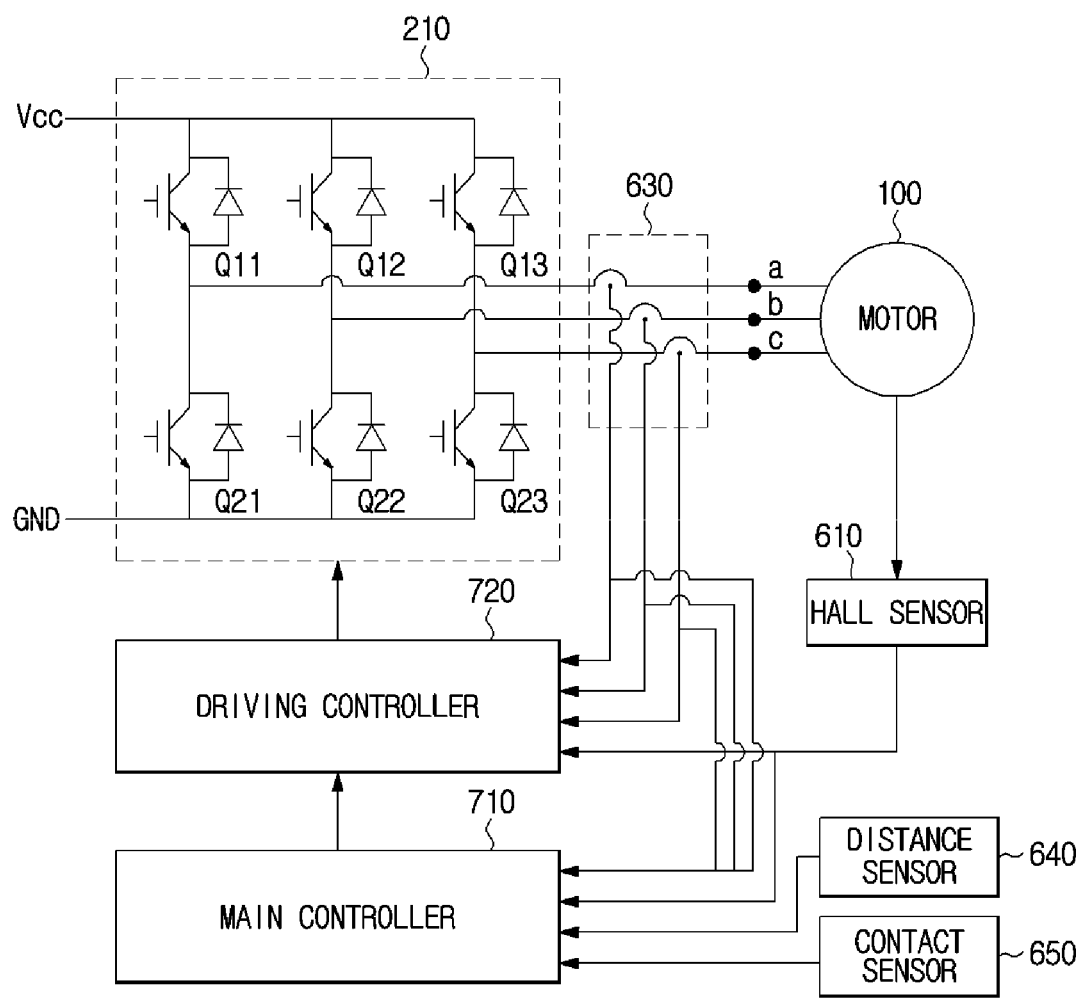
Figure 10:
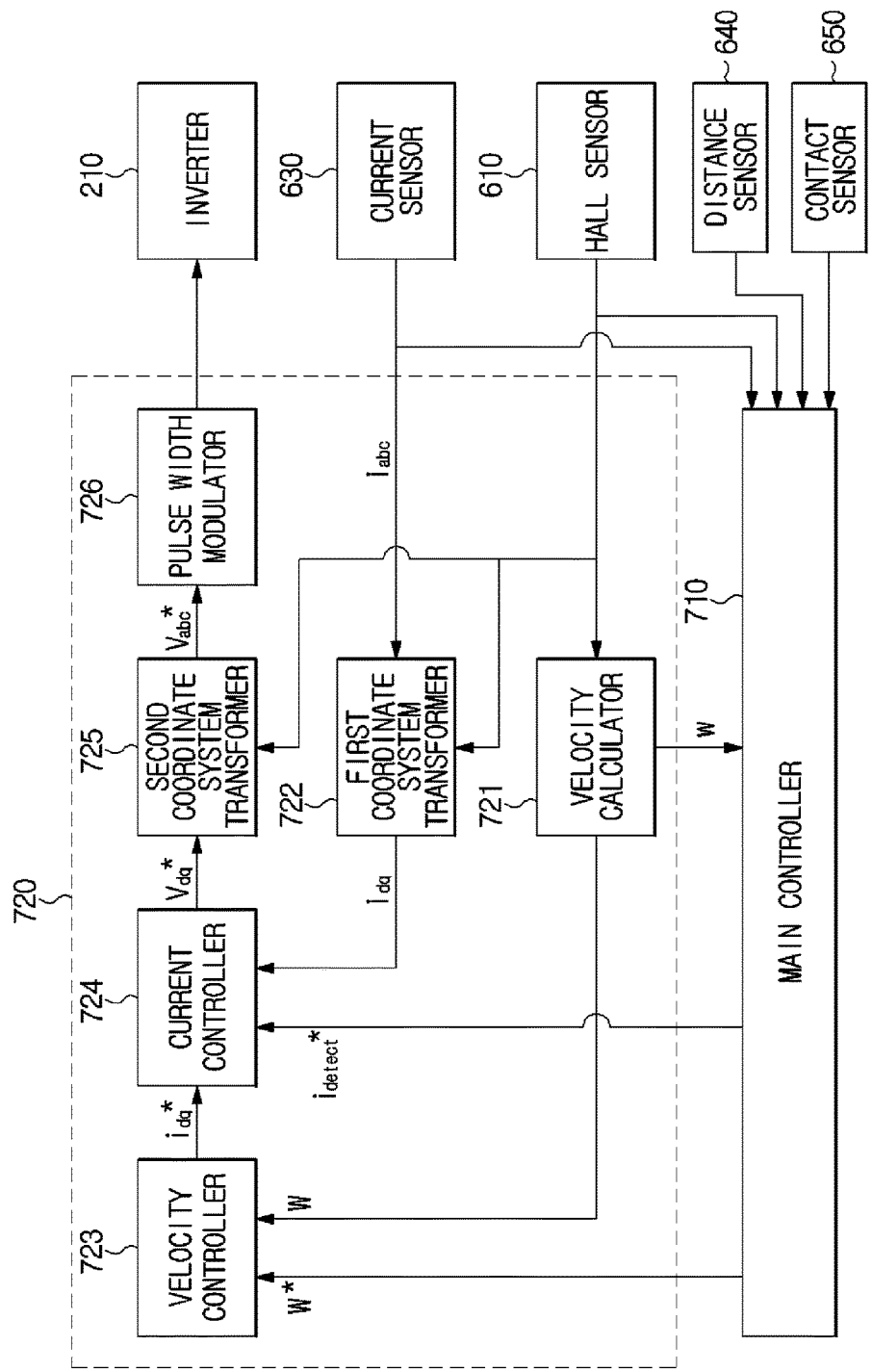

FIGS. 8, 9, and 10 are block diagrams illustrating configurations of a driving unit, a sensing unit, and a controller of the cleaner 1, according to an embodiment of the present disclosure.

A driving unit 200 may include, for example, a motor device 20 to generate a rotation force, and an inverter 210 to supply driving current to the motor 100.

The motor device 20 may be the same motor device 20 as described above with reference to FIGS. 3, 4, and 5.

As shown in FIG. 9, the inverter 210 may include three upper switching circuits Q11 to Q13, and three lower switching circuits Q21 to Q23.

Each of the upper switching circuits Q11 to Q13 and the lower switching circuits Q21 to Q23 may include a high-voltage switch and a free wheeling diode, wherein the high-voltage switch may be a High Voltage Bipolar Junction Transistor, a High Voltage Field Effect Transistor, or a insulated gate bipolar transistor (IGBT).

More specifically, the upper switching circuits Q11 to Q13 may be connected in parallel to a supply voltage Vcc, and the lower switching circuits Q21 to Q23 may be connected in parallel to a ground GND. Also, the upper switching circuits Q11 to Q13 and the lower switching circuits Q21 to Q23 are one-to-one connected in series, and three nodes at which the upper switching circuits Q11 to Q13 are respectively connected to the lower switching circuits Q21 to Q23 may be connected to three input terminals a, b, and c of the motor 100.

The inverter 210 may supply driving current to the motor 100 by turning on one of the upper switching circuits Q11 to Q13 and one of the lower switching circuits Q21 to Q23 in a predetermined order.

A sensing unit 600 may include a hall sensor 610 to sense rotational displacement of the rotor 110, and a cleaning detection sensor 620 to determine whether or not a user is cleaning.

The cleaning detection sensor 620 may include a distance sensor 640 to sense a distance between the brush and the ground, a contact sensor 650 to sense a contact of the brush to the ground, and a current sensor 630 to measure a driving current.

The sensing unit 600 may be the same sensing unit 600 as described above with reference to FIG. 2.

A controller 700 may include a main controller 710 to control overall operations of the cleaner 1, and a driving controller 720 to control operations of the driving unit 200.

The main controller 710 may transfer a velocity command w* or a motor restraint sensing current command idetect* to the driving controller 720 according to an operation command from a user, and control the display unit 900 to display cleaning information according to the operation command from the user. Specifically, the main controller 710 may output a velocity command w* for the motor 100 upon rearrangement, start-up, normal operation, and energy-saving operation, and a motor restraint sensing current command idetect* for detecting restraint of the motor 100 upon start-up, normal operation, and energy-saving operation.

The main controller 710 may supply rearrangement power or stopping power before supplying motor start-up power. Supplying rearrangement power and stopping power has been described above with reference to FIGS. 6A, 6B, 6C, and 7.

Also, if the main controller 710 determines that a user is not performing cleaning based on the result of detection by the sensor 600, the main controller 710 may control the power supply 300 (see FIG. 2) to supply energy-saving power or reduced power to the motor 100. That is, if a load of the cleaner 1 increases due to an increase of the orifice diameter of the suction port when a user lifts the suction unit 40 from the floor or surface being cleaned during cleaning, the main controller 710 may control the power supply 300 to supply energy-saving power or reduced power in order to reduce consumption power.

More specifically, the main controller 710 may control, as described above with reference to FIG. 2, the power supply 300 to supply energy-saving power to the motor 100, when a rotation velocity of the rotor 110 decreases, based on a change in rotation velocity of the rotor 110, sensed by the hall sensor 610. For example, if a rotation velocity of the rotor 110, sensed by the hall sensor 610 is lower than a predetermined velocity, the main controller 710 may control the power supply 300 to supply energy-saving power to the motor 100. In this case, the predetermined velocity may be decided according to the specification of the motor 100, the load of the cleaner 1, etc. However, the predetermined velocity may be decided according to various cleaning environmental variables rather than the specification of the motor 100 and the load of the cleaner 1.

Also, the main controller 710 may control, as described above with reference to FIG. 2, the power supply 300 to supply energy-saving power to the motor 100, based on driving current flowing through the motor 100, sensed by the current sensor 630, that is, when driving current increases. For example, if a driving current value sensed by the current sensor 630 is equal to or greater than a predetermined current value, the main controller 710 may control the power supply 300 to supply energy-saving power to the motor 100. In this case, the predetermined current value may be decided according to the specification of the motor 100, the load of the cleaner 1, etc. However, the predetermined current value may be decided according to various cleaning environmental variables rather than the specification of the motor 100 and the load of the cleaner 1.

Also, the main controller 710 may control, as described above with reference to FIG. 2, the power supply to supply energy-saving power to the motor 100, based on a distance between the brush and the ground, measured by the distance sensor 640, that is, when the measured distance is equal to or longer than a predetermined distance. In this case, the predetermined distance may be decided according to the length of the connecting pipe of the cleaner 1, the user's body, etc. However, the predetermined distance may be decided according to various variables rather than the length of the connecting pipe of the cleaner 1 and the user's body.

Also, the main controller 710 may control, as described above with reference to FIG. 2, the power supply to supply energy-saving power to the motor 100, based on a contact of the brush to the ground, detected by the contact sensor 650, that is, when it is determined that the brush does not contact the ground. In this case, an error range of a predetermined contact signal may be set in consideration of an error value when a contact has occurred.

In order to reduce consumption power of the cleaner 1, the energy-saving power may be set to be smaller by a predetermined value from a maximum power, a free-wheel state may be maintained, and a ratio of free-wheel and excitation may be adjusted.

In detail, the energy-saving power may be supplied such that consumption power is less than 40% of the maximum power of the cleaner 1. For example, if the maximum power of the motor 100 is 450 W, energy-saving power may be supplied such that power of 100 W is consumed when a user does is cleaning. Also, if the maximum power of the motor 100 is 600 W, energy-saving power may be supplied such that a power of 150 W is consumed when a user is not cleaning.

Also, the energy-saving power may be supplied such that a rotation velocity that is obtained when the energy-saving power is supplied is lower than 60% of the maximum velocity of the motor 100. For example, if the maximum velocity of the motor is 90 kRpm, energy-saving power may be supplied such that a rotation velocity that is obtained when the energy-saving power is supplied to the motor 100 is 50 kRpm.

Accordingly, by supplying energy-saving power to the motor 100 based on whether or not a user is cleaning, it is possible to reduce consumption power of the cleaner 1, and if the cleaner 1 is a cordless cleaner or a stick cleaner using a battery, it is possible to lengthen a use time of the cleaner 1 and a lifetime of the battery.

As shown in FIG. 10, the driving controller 720 may include, for example, a velocity calculator 721, a first coordinate system converter 722, a current controller 724, a second coordinate system transformer 725, and a pulse width modulator 726.

The velocity calculator 721 may calculate a rotation velocity w of the motor 100, based on a rotation angle and a frequency of the rotor 110, provided by the hall sensor 610 included in the motor 10, and provide information about the rotation velocity w to the velocity calculator 723 and the main controller 710.

The velocity controller 723 may calculate a dq-axis current command idq* using a difference between the velocity command w* output from the main controller 710 and the rotation velocity w of the motor 100 output from the velocity calculator 721, and may provide the dq-axis current command idq* to the current controller 724.

The first coordinate system transformer 722 may transform a 3-phase driving current value iabc of the motor 100, output from the current sensor 630, into a dq-axis current value idq, based on the rotational displacement of the rotor 110 output from the hall sensor 610, and provide the dq-axis current value idq to the current controller 724.

The current controller 724 may calculate a dq-axis voltage command vdq* using a difference between the dq-axis current command idq* output from the velocity controller 723 and the dq-axis current value idq output from the first coordinate system transformer 722, or using a difference between the motor restraint sensing current command idetect* output from the main controller 710 and the dq-axis current value idq output from the first coordinate system transformer 722, and provide the dq-axis voltage command vdq* to the second coordinate system transformer 725.

The second coordinate system transformer 725 may transform the dq-axis voltage command vdq* output from the current controller 724 into a 3-phase voltage command vabc*, based on the rotational displacement of the rotor 110 output from the hall sensor 610, and provide the 3-phase voltage command vabc* to the pulse width modulator 726.

The pulse width modulator 726 may output a pulse width modulation signal for controlling the upper switching circuits Q11 to Q13 and the lower switching circuits Q21 to Q23 included in the inverter 210, based on the 3-phase voltage command vabc* output from the second coordinate system transformer 725.

In summary, the driving controller 720 may output a pulse width modulation signal for controlling the inverter 210 according to a velocity command w* or a motor restraint sensing current command idetect* output from the main controller 710.

In detail, if a velocity command w* is received from the main controller 710, the driving controller 720 may calculate a rotation velocity w of the motor 100 using information about rotational displacement of the rotor 110 fed back from the hall sensor 610 of the motor 100, and compare the rotation velocity w to the velocity command w* to control driving current of the motor 100 based on the result of the comparison. Also, if a motor restraint sensing current command idetect* is received from the main controller 710, the driving controller 720 may feed forward the motor restraint sensing current command idetect* to the motor 100.

Hereinafter, a method of reducing a start-up failure of the motor 100 that is caused by cogging torque will be described with reference to FIG. 11.

Figure 11:
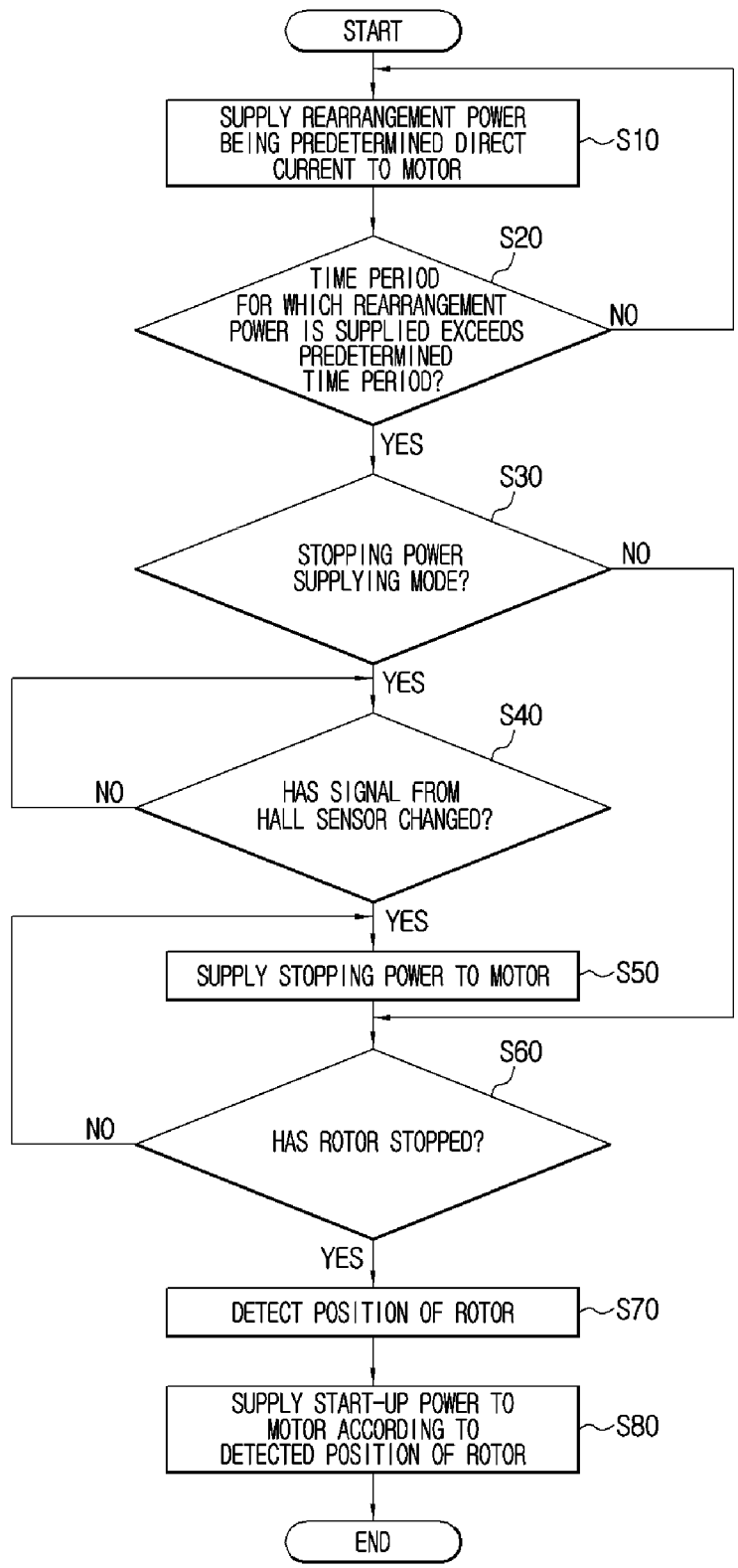
FIG. 11 is a flowchart illustrating a method of supplying rearrangement power before starting up a motor, and then starting up the motor, according to an embodiment of the present disclosure.

FIG. 11 is a flowchart illustrating a method of supplying rearrangement power before starting up the motor 100, and then starting up the motor 100, according to an embodiment of the present disclosure.

First, a controller may supply rearrangement power being predetermined direct current to a motor before starting up the motor, at operation S10. Then, the controller may determine whether a time period for which the rearrangement power is supplied exceeds a predetermined time period, at operation S20.

If the controller determines that a time period for which the rearrangement power is supplied does not exceed the predetermined time period, the controller may determine that a rotor is at an improper position, and return to operation S10 to continue to supply the rearrangement power to the motor. If the controller determines that a time period for which the rearrangement power is supplied exceeds the predetermined time period, the controller may determine that the rotor is at a proper position.

Thereafter, the controller may determine whether a current mode is a stopping power supplying mode, at operation S30.

If the controller determines that a current mode is a stopping power supplying mode, the controller may determine whether a signal from a hall sensor has changed from positive to negative or from negative to positive, at operation S40. If the controller determines that the signal from the hall sensor has not changed, the controller may determine that the polarity of a permanent magnet adjacent to the hall sensor has not changed, and continue to determine whether a signal from the hall sensor changes. Meanwhile, if the controller determines that the signal from the hall sensor has changed, the controller may determine that the polarity of a permanent magnet adjacent to the hall sensor has changed, and supply stopping power to the motor, at operation S50. In this case, the stopping power is used to reduce a rotation force generated by the rearrangement power supplied to the motor, and may be set such that negative q-axis current flows to generate torque in an opposite direction to the rotation force of the motor.

If the controller determines that a current mode is not a stopping power supplying mode, or if the controller has supplied stopping power to the motor, the controller may determine whether the rotor has stopped based on a signal from the hall sensor, at operation S60. For example, if the controller determines that a signal from the hall sensor has not changed for a predetermined time period, the controller may determine that the rotor has stopped.

Thereafter, if the controller determines that the rotor has not stopped although a current mode is a stopping power supplying mode, the controller may supply stopping power to the motor until the rotor stops.

Meanwhile, if the controller determines that the rotor has stopped, the controller may detect a position of the rotor at operation S70. That is, the controller may determine a polarity of a permanent magnet adjacent to the corresponding teeth piece based on a signal from the hall sensor.

Then, the controller may supply start-up power to the motor according to the detected position of the rotor so that the same polarity as that of the permanent magnet adjacent to the teeth piece is magnetized to the teeth piece to generate a repulsive force, at operation S80.

Hereinafter, a method of reducing consumption power of a cleaner will be described with reference to FIG. 12.

FIG. 12 is a flowchart illustrating a method of determining whether or not cleaning is performed and saving power according to the result of the determination, according to an embodiment of the present disclosure.

First, the cleaner may perform rotor rearrangement of supplying rearrangement power to a motor to locate the rotor at a proper position, at operation S100, and supply appropriate start-up power to the motor based on a signal from a hall sensor to perform motor start-up, at operation S110.

Then, the cleaner may supply normal power to the motor to perform cleaning, at operation S120, and detect cleaning operation, at operation S130.

The controller may determine whether no cleaning is performed, based on the result of detection by a cleaning detection sensor, at operation S140.

If the controller determines that cleaning is performed, the controller may again perform operations S120 and S130. In contrast, if the controller determines that no cleaning is performed, the controller may supply energy-saving power to the motor at operation S150, and the cleaning detection sensor may detect cleaning operation, at operation S160.

Thereafter, the controller may determine whether no cleaning is performed, at operation S170, and if the controller determines that no cleaning is performed, the cleaner may again perform operations S150 and S160. However, if the controller determines that cleaning is performed, the cleaner may supply normal power to the motor to perform cleaning, at operation S180.

According to the cleaner and the control method thereof as described above, by supplying rearrangement power to the motor before starting up the motor, a start-up failure of the motor may be reduced without detecting the position of the rotor, and by adjusting power according to a cleaning operation state, consumption power may be reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A control method of a cleaner, comprising:
   supplying predetermined rotor rearrangement power, which is power supplied for rearrangement of a position of a rotor, to a motor of the cleaner for a predetermined time period until cogging torque of the motor reaches a maximum, and ending the supply of the predetermined rotor rearrangement power to the motor when the cogging torque of the motor reaches the maximum;
   detecting a position of the rotor of the motor using a hall sensor;
   supplying start-up power to the motor according to the detected position of the rotor, and
   supplying stopping power to the motor after the cogging torque of the motor reaches the maximum,
   wherein the stopping power is supplied in an opposite direction to that of the rotor rearrangement power, or the stopping power is a zero voltage, and
   wherein the rotor rearrangement power is supplied such that torque that is generated by the rotor rearrangement power is greater than cooing torque of the motor.

2. The control method according to claim 1, wherein the rotor rearrangement power is direct current.

3. The control method according to claim 1, wherein a magnitude of the rotor rearrangement power is smaller than a magnitude of the start-up power.

4. The control method according to claim 1, further comprising:
   determining whether or not cleaning is currently performed by the cleaner; and
   supplying energy-saving power if it is determined that no cleaning is currently performed by the cleaner.

5. The control method according to claim 4, wherein the energy-saving power is supplied such that consumption power is less than 40% of maximum power.

6. The control method according to claim 4, wherein the energy-saving power is supplied such that a velocity of the motor is lower than 60% of a maximum velocity of the motor.

7. The control method according to claim 4, wherein whether or not cleaning is currently performed by the cleaner is determined by measuring a rotation velocity of the rotor through the hall sensor, and
   wherein the energy-saving power is supplied if the measured rotation velocity of the rotor is lower than a predetermined rotation velocity.

8. The control method according to claim 4, wherein whether or not cleaning is currently performed by the cleaner is determined by measuring a distance between a main suction port and a surface being cleaned through a distance sensor, and
   wherein the energy-saving power is supplied if the measured distance is equal to or longer than a predetermined distance.

9. The control method according to claim 4, wherein whether or not cleaning is currently performed by the cleaner is determined by detecting a contact of a main suction port of the cleaner to a surface being cleaned through a contact sensor, and
   wherein the energy-saving power is supplied if the contact sensor detects a contact of the main suction port to the surface being cleaned.

10. The control method according to claim 4, wherein whether or not cleaning is currently performed by the cleaner is determined by measuring current flowing through the motor by a current sensor, and
    wherein the energy-saving power is supplied if the measured current is equal to or greater than predetermined current.

11. A cleaner comprising:
    a power supply;
    a suction unit including a main suction port;
    a driving unit including a motor including a rotor and a stator;
    a sensing unit including a hall sensor to detect a position of the rotor; and
    a controller configured to control the power supply to supply predetermined rotor rearrangement power, which is power supplied for rearrangement of the position of the rotor, to the motor for a predetermined time period until cogging torque of the motor reaches a maximum, ending the supply of the predetermined rotor rearrangement power to the motor when the cogging torque of the motor reaches the maximum, supply start-up power to the motor according to the position of the rotor detected by the hall sensor, and supply stopping power to the motor after the cogging torque of the motor reaches the maximum,
    wherein the stopping power is supplied in an opposite direction to that of the rotor rearrangement power, or the stopping power is a zero voltage, and wherein the rotor rearrangement power is supplied such that torque that is generated by the rotor rearrangement power is greater than cogging torque of the motor.

12. The cleaner according to claim 11, wherein the rotor rearrangement power is direct current.

13. The cleaner according to claim 11, wherein the controller controls the rotor rearrangement power such that the rotor rearrangement power is greater than the start-up power.

14. The cleaner according to claim 11, wherein the sensing unit further comprises a cleaning detection sensor configured to determine whether or not cleaning is currently performed by the cleaner, and
wherein the controller controls the power supply to supply energy-saving power to the motor if the controller determines that no cleaning is currently performed by the cleaner.

15. The cleaner according to claim 14, wherein the controller controls the energy-saving power such that consumption power is less than 40% of maximum power.

16. The cleaner according to claim 14, wherein the controller controls the energy-saving power such that a velocity of the motor is lower than 60% of a maximum velocity of the motor when the energy-saving power is supplied.

17. The cleaner according to claim 14, wherein the hall sensor measures a rotation velocity of the rotor, and
wherein the controller controls the power supply to supply the energy-saving power to the motor if the measured rotation velocity of the rotor is equal to or lower than a predetermined rotation velocity.

18. The cleaner according to claim 14, wherein the cleaning detection sensor comprises a distance sensor configured to measure a distance between the main suction port and a surface being cleaned, and
wherein the controller controls the power supply to supply the energy-saving power to the motor if the measured distance is equal to or longer than a predetermined distance.

19. The cleaner according to claim 14, wherein the cleaning detection sensor comprises a contact sensor configured to detect a contact of the main suction port to a surface being cleaned, and
wherein the controller controls the power supply to supply the energy-saving power to the motor if the contact sensor detects a contact of the main suction port to the surface being cleaned.

20. The cleaner according to claim 14, wherein the sensing unit further comprises a current sensor configured to measure current flowing through the motor, and
wherein the controller controls the power supply to supply the energy-saving power to the motor if the measured current is equal to or greater than predetermined current.

* * * * *